United States Patent
Ciuperca

(10) Patent No.: US 12,122,726 B1
(45) Date of Patent: Oct. 22, 2024

(54) PORTLAND CEMENT CLINKER MANUFACTURE USING HYALOCLASTITE OR LAVA AND METHOD OF MAKING AND USING SAME

(71) Applicant: Greencraft LLC, Norcross, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

(21) Appl. No.: 18/737,977

(22) Filed: Jun. 8, 2024

Related U.S. Application Data

(60) Provisional application No. 63/507,097, filed on Jun. 8, 2023.

(51) Int. Cl.
*C04B 7/42* (2006.01)
*C04B 7/44* (2006.01)
*C04B 7/52* (2006.01)

(52) U.S. Cl.
CPC ............... *C04B 7/427* (2013.01); *C04B 7/44* (2013.01); *C04B 7/52* (2013.01)

(58) Field of Classification Search
CPC .............. C04B 7/427; C04B 7/44; C04B 7/52
See application file for complete search history.

(56) References Cited

FOREIGN PATENT DOCUMENTS

| | | | |
|---|---|---|---|
| CN | 113461347 A | * | 10/2021 |
| KR | 10-0554715 B1 | * | 2/2006 |

* cited by examiner

*Primary Examiner* — Anthony J Green
(74) *Attorney, Agent, or Firm* — Robert E. Richards

(57) ABSTRACT

The invention comprises a method of making a hydraulic cement clinker. The method comprises delivering a natural calcium-iron-aluminosilicate mineral from one or more of hyaloclastite, lava, scoria, volcanic glass, volcanic ash, or any other mineral of a basaltic or intermediate basaltic chemical composition and blending it in ground form with limestone, calcium oxide or calcium hydroxide. The blended mixture is calcined in a portland cement clinker kiln at an elevated temperature and for a time sufficient to form a hydraulic cement clinker.

19 Claims, No Drawings

PORTLAND CEMENT CLINKER MANUFACTURE USING HYALOCLASTITE OR LAVA AND METHOD OF MAKING AND USING SAME

CROSS-REFERENCE TO RELATED APPLICATIONS

The present application claims the benefit of application Ser. No. 63/507,097 filed Jun. 8, 2023.

FIELD OF THE INVENTION

The present invention generally relates to manufacturing a hydraulic cement clinker using a calcium-iron-aluminosilicate mineral and limestone, calcium hydroxide or calcium oxide. The present invention also reduces the amount of carbon dioxide gas emitted during the conventional portland cement clinker manufacturing process by substituting a calcium-iron-aluminosilicate mineral for at least a portion of the limestone, calcium hydroxide or calcium oxide required for the conventional portland cement manufacturing process.

BACKGROUND OF THE INVENTION

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement.

Portland cement is the most commonly used hydraulic cement in use around the world today. Portland cement typically is made from limestone. Concrete or mortar made with portland cement sets relatively quickly and gains relatively high compressive strength in a relatively short time. Although significant improvements have been made to the process and efficiency of portland cement manufacturing, it is still a relatively expensive and highly polluting industrial process. The cement manufacture process generates significant amount of $CO_2$, in some cases up to 800 kg per ton of portland cement. Most of the $CO_2$ is released during clinker manufacture where the limestone (calcium carbonate) calcination process releases $CO_2$ to create clinker.

Portland cement is made from grinding clinker and gypsum. The clinker manufacturing process involves crushing limestone and different minerals each containing one or more of alumina (usually from a clay), iron (usually iron ore) and silica (usually quartz), blending these four minerals and feeding them into a high temperature clinker kiln for a sufficient amount of time whereby the limestone calcination process releases the $CO_2$ and becomes CaO that binds with Al, Fe, Si and other minor constituents to create portland cement clinker at a temperature of approximately 1450° C. This process releases the $CO_2$ bonds to Ca and Mg in the limestone thereby producing significant amount of $CO_2$, pollutant gases, dust and other compounds. That is, the calcining of the portland cement clinker mixture converts $Ca(CO_2)_2$ and optionally $MgCO_3$ to CaO and MgO and releases significant amounts to $CO_2$ in the process. This released $CO_2$ is a greenhouse gas that contributes to the increased amount of $CO_2$ in the atmosphere and consequently contributes to global warming.

The portland cement industry has been under pressure to reduce the amount of $CO_2$ emissions per ton of cement produced. One way to reduce the carbon footprint of cement is to reduce the clinker factor from the total cement content. Historically, portland cement has used ground limestone to reduce the clinker factor. The ground limestone percentage varies anywhere from 5-35% based on different countries and applications. Ground limestone works as an inert filler and does not have any cementitious or pozzolanic properties. Another way to reduce the carbon footprint and clinker factor is to replace clinker with slag cement in various percentage depending on the jurisdiction and the application. Another method to reduce the clinker factor is to substitute a portion of the clinker with a pozzolan. Historically, fly ash has been used in various percentages alongside portland cement clinker depending on the jurisdiction and application and varied from 5%-80%. However, due to many coal power plant closures, the fly ash market has experienced significant shortages which increased demand for other types and sources of pozzolans. Natural pozzolans are currently in greater demand to replace fly ash either in the portland cement types or in concrete.

The manufacture of portland cement generates significant amounts of $CO_2$. By some estimates as much as 7% of global $CO_2$ emission can be traced to the manufacture of portland cement. As a result, great emphasis is being placed on the reduction of $CO_2$ from portland cement manufacture, such as carbon capture and carbon sequestration. Yet, the portland clinker manufacturing process in current use is hardly unchanged from the initial process of grinding limestone, clay, iron ore and silica. The present invention addresses this process by improving the efficiency of the manufacturing process and reducing emissions, the carbon foot print and increasing productivity using the same manufacturing plant installation.

SUMMARY OF THE INVENTION

The present invention satisfies the foregoing needs by providing a clinker manufacture process using limestone, calcium oxide or calcium hydroxide and a mineral containing alumina, silica and iron necessary to manufacture clinker. We refer to this herein as calcium-iron-aluminosilicate mineral that contains un-carbonated Ca and optionally Mg (usually in the form of CaO and MgO) in an amorphous or crystalline matrix or a combination thereof. Along with Ca and Mg these minerals contain Al, Si and Fe, combined in an amorphous or crystalline form or a combination thereof, also combined with other minor elements. When the calcium-iron-alumino-silicate mineral is mixed with limestone in the normal process of clinker manufacture, it supplies the alumina, silicon and iron required for the manufacture of clinker that under current practice would come from three different minerals, such as iron from an iron ore, alumina from a clay and silica from a crystalline silica mineral generally containing quartz. The calcium-iron-aluminosilicate mineral provides a homogenous mineral composition of a set ratio between the alumina, iron and silica and when mixed with limestone improves the burnability and efficiency of the kiln clinker sintering process that creates clinker as a finished product. By having one mineral contain the three elements necessary to be added to limestone to make clinker into one mineral the energy consumption and pollutants are reduced. Additionally, the calcium-iron-aluminosilicate mineral contains calcium in an un-carbonated state which replaces a portion of the limestone or lime and therefore does not release any $CO_2$ during the clinker manufacture process. Generally, by using one mineral containing calcium, iron, alumina and silica together the emissions associated with the current clinker manufacturing process of using three different minerals to supply a portion of the Calcium oxide, and each of the alumina, iron and silica is also reduced. By using limestone and the calcium-iron-alumina-silicate mineral, especially containing a certain amount of amorphous matrix or content, the kiln temperature and time required to manufacture clinker is reduced, thereby reducing the carbon footprint of the clinker manufacturing process. In addition, the calcium-iron-aluminosilicate mineral contains Ca needed in the clinker composition, so by using this mineral it lowers the amount of limestone required to manufacture clinker. The un-carbonated Ca found on the calcium-iron-aluminosilicate mineral contributes this portion of the Ca to the clinker composition without any $CO_2$ emissions. In other words, the amount CaO contained in the calcium-iron-aluminosilicate mineral replaces the CaO that would normally be provided from limestone calcination thereby reducing the amount of CO2 that would normally be generated by the limestone calcination. Typically, a calcium-iron-aluminosilicate mineral contains approximately 8% to approximately 25% CaO which means that a clinker made using the mineral of the present invention as a partial replacement for the limestone will reduce the $CO_2$ emissions by a roughly equal amount of the CaO found in the mineral. This further reduces the total carbon footprint of the clinker manufacturing process.

In another embodiment limestone can be placed into a pre-calciner, such as Leilac France process, with carbon capture process to separate the carbon dioxide from the calcium oxide resulting in lime (calcium oxide). The $CO_2$ is separated from the CaO by calcination prior to mixing with iron, alumina and silica. The $CO_2$ can then be collected from the pre-calciner and sequestered or mineralized in any conventional way or as described in U.S. Pat. Nos. 11,884,602 and 11,986,769 and U.S. patent application Ser. No. 18/416,240 filed Jan. 18, 2024 and Ser. No. 18/421,638 filed Jan. 24, 2024 (the disclosures of which are all incorporated herein by reference in their entirety). The CaO (lime) can then be placed into a kiln along with the calcium-alumino-iron-silicate mineral and optionally minor iron, alumina and/or silica corrective minerals and heated to the required temperatures of the clinker stages process to create a hydraulic cement clinker such as portland cement clinker. Alternatively, the calcium oxide (lime) can be produced by any means or processes regardless of the carbon capture or not.

In another embodiment limestone can be dissolved in a solution and placed into an electrochemical reactor. The $CO_2$ is then separated from the CaO or CaOH by an electrolysis process. The $CO_2$ can then be collected from the electrolysis reactor and sequestered or mineralized in any conventional way or as described in U.S. Pat. Nos. 11,884,602 and 11,986,769 and U.S. patent application Ser. No. 18/416,240 filed Jan. 18, 2024 and Ser. No. 18/421,638 filed Jan. 24, 2024 (the disclosures of which are all incorporated herein by reference in their entirety). The CaO or CaOH can then be placed into a kiln along with the calcium-alumino-iron-silicate mineral and optionally and optionally minor iron, alumina and/or silica corrective minerals and heated to the required temperatures of the clinker stages process to create a hydraulic cement clinker such as portland cement clinker.

In another disclosed embodiment, the present invention comprises a clinker manufacturing process using a natural calcium-iron-aluminosilicate mineral within the chemical composition preferably comprises approximately 30 to approximately 57 percent by weight $SiO_2$, approximately 8 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5.

In another disclosed embodiment, the present invention comprises a calcium-iron-aluminosilicate mineral from one or more of hyaloclastite, lava, gabbro, volcanic ash, scoria, pumice or any igneous, plutonic, sedimentary or man-made mineral with a basaltic or intermediate chemistry.

Accordingly, it is an object of the present invention to provide an improved hydraulic cement clinker manufacturing process with reduced $CO_2$ emissions.

Another object of the present invention is to provide an improved hydraulic cement clinker manufacturing process that uses less energy.

Another object of the present invention is to provide a process of clinker manufacture whereby the $CO_2$ is directly captured from limestone by a process of electrolysis and not from the flue gases, creating CaO which is then combined with the calcium-iron-aluminosilicate mineral and optionally minor constituents and heated to the desired temperatures to create a hydraulic cement clinker such as portland cement clinker.

Another object of the present invention is to provide a process of clinker manufacture whereby calcium oxide instead of limestone is combined with the calcium-iron-aluminosilicate mineral and optionally minor constituents and heated to the desired temperatures to create a hydraulic cement clinker such as portland cement clinker.

Another object of the present invention is to provide a portland cement clinker manufacturing process that requires a lower temperature and time in the kiln thereby reducing overall emissions and increasing the kiln production capacity when compared with current practice.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere which can then land back on the ground. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice.

Volcanic, plutonic, metamorphic or man-made calcium-iron-aluminosilicate minerals, such as hyaloclastite, lava, scoria, volcanic ash, or pumice, can be classified based on the amount of silica content as: basaltic (less than 53% by weight $SiO_2$), intermediate basaltic (approximately 53-57% by weight $SiO_2$), or silicic such as andesitic (approximately 57-63% by weight $SiO_2$), dacitic (approximately 63-69% by weight $SiO_2$), or rhyolitic (greater than 69% by weight $SiO_2$). However, for the purpose of this invention the basaltic range starts at 40% $SiO_2$ and the andesitic range ends at 65% $SiO_2$.

Basaltic calcium-iron-aluminosilicate such as hyaloclastite, lava, scoria, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, calcium-iron-aluminosilicate such as basaltic hyaloclastite, volcanic ash or pumice generally comprises approximately 10 to approximately 18 percent by weight $Fe_2O_3$, approximately 6 to approximately 18 percent by weight CaO, approximately 5 to approximately 15 percent by weight MgO and other elements in various percentages. Intermediate basaltic calcium-iron-aluminosilicate such as hyaloclastite, volcanic ash or pumice generally comprises approximately 53 to approximately 57 percent by weight silica ($SiO_2$) content. In addition to silica, intermediate basaltic calcium-iron-aluminosilicate such as hyaloclastite, volcanic ash or pumice generally comprises approximately 5 to approximately 10 percent by weight $Fe_2O_3$, approximately 6 to approximately 10 percent by weight CaO, approximately 3 to approximately 10 percent by weight MgO and other elements in various percentages. Basaltic calcium-iron-aluminosilicate such as hyaloclastite, volcanic ash or pumice may also contain quartz, hornblende, biotite, hypersthene (an orthopyroxene) and feldspathoids. The average specific density of basaltic calcium-iron-aluminosilicate such as hyaloclastite, volcanic ash or pumice is approximately 2.7-3.0 gm/cm$^3$.

Andesite is an abundant igneous (volcanic) rock of intermediate composition, with aphanitic to porphyritic texture. In a general sense, it is an intermediate type between basalt and dacite. Andesitic calcium-iron-aluminosilicate such as hyaloclastite, volcanic ash or pumice ranges from approximately 57 to approximately 63 percent by weight silicon dioxide ($SiO_2$). For the purpose of this invention, we extend the andesite $SiO_2$ content up to 65%. In addition to silica, andesitic calcium-iron-aluminosilicate such as hyaloclastite, volcanic ash or pumice generally comprises approximately 5 to approximately 10 percent by weight $Fe_2O_3$, approximately 5 to approximately 10 percent by weight CaO, approximately 3 to approximately 8 percent by weight MgO and other elements in various percentages.

Dacite is an igneous, volcanic rock with an aphanitic to porphyritic texture and is intermediate in composition between andesite and rhyolite and ranges from approximately 63% to approximately 69% by weight silicon dioxide ($SiO_2$). In addition to silica, dacite calcium-iron-aluminosilicate generally contains approximately 4 to approximately 8% by weight $Fe_2O_3$, approximately 3 to approximately 8% by weight CaO, approximately 1 to approximately 6% by weight MgO and other elements in various percentages. It consists mostly of plagioclase feldspar with biotite, hornblende, and pyroxene (augite and/or enstatite). It has quartz as rounded, corroded phenocrysts, or as an element of the ground-mass. The plagioclase ranges from oligoclase to andesine and labradorite. Sanidine occurs, although in small proportions, in some dacites, and when abundant gives rise to rocks that form transitions to the rhyolites. The groundmass of these rocks is composed of plagioclase and quartz.

Rhyolite is an igneous (volcanic) rock of felsic (silica-rich) composition, typically greater than 69% by weight $SiO_2$. In addition to silica, rhyolite generally contains 0 to approximately 5% by weight $Fe_2O_3$, approximately 0.5 to approximately 6% by weight CaO, 0 to approximately 2% by weight MgO and other elements in various percentages. It may have a texture from glassy to aphanitic to porphyritic. The mineral assemblage is usually quartz, sanidine and plagioclase. Biotite and hornblende are common accessory minerals.

The different types of calcium-iron-aluminosilicates minerals contain varying amounts of uncarbonated elements; i.e., Ca, Mg, K, Na and Fe, that when mixed with limestone, CaO or CaOH improve the clinker manufacturing process. As an example, the calcium-iron-aluminosilicate mineral, such as hyaloclastite, lava, gabbro, scoria, volcanic ash or pumice classified based on the amount of silica content comprises the following elements: basaltic calcium-iron-aluminosilicate such as hyaloclastite, volcanic ash or pumice (less than approximately 53% by weight $SiO_2$) contains CaO of approximately 6 to approximately 18% by weight, MgO approximately 5 to approximately 15% by weight, $K_2O$ approximately 1% by weight, $Na_2O$ approximately 3% by weight and $Fe_2O_3$ approximately 10 to approximately 18% by weight; intermediate hyaloclastite, volcanic ash or pumice (approximately. 53 to approximately 57% by weight $SiO_2$) comprises CaO of approximately 6 to approximately 10% by weight, MgO approximately 3 to approximately 10% by weight, $K_2O$ approximately 1% by weight, $Na_2O$ approximately 3% by weight and $Fe_2O_3$ approximately 5 to approximately 10% by weight; As used herein, the term "calcium-iron-aluminosilicate mineral" means hyaloclastite, lava, gabbro, volcanic ash, scoria, pumice or any similar minerals from any and all sources; i.e., all irrespective of the mineral source from which it is derived, natural such as igneous, plutonic, metamorphic or man-made, unless otherwise designated, with an amorphous content of 0-100% and a crystalline content of 0-100% wherein the crystalline matrix is comprised of one or more of crystals, microcrystals, nano-crystals or any combination thereof. As used herein, the term "lava" means lava that has been expelled from below ground and cooled to a solid form, which is also known as extrusive igneous rock.

Basaltic or mafic calcium-alumino-iron-silicate such as hyaloclastite, lava, volcanic ash, or pumice generally has approximately 4 to approximately 18% by weight uncarbonated calcium found with the amorphous matrix or a combination of amorphous and micro or nano crystalline matrix. As the amount of $SiO_2$ increases from the low of 40% by weight for basaltic hyaloclastite, volcanic ash, scoria or pumice to the andesitic and dacitic silica range, the uncarbonated calcium, magnesium, iron decreases to where in the rhyolitic range there is virtually no uncarbonated calcium available.

Typical cement manufacturing is a complex process that begins with mining and then grinding raw materials that include limestone, clay and additional corrective minerals to provide the appropriate amount of iron, alumina and silica, to a fine powder, called raw meal, which is then heated to a sintering temperature as high as 1450° C. in a cement kiln. In the conventional limestone calcination clinker manufacturing process, a total of 1.55 tons of raw meal is needed for each ton of cement clinker produced. In other words, the delta of 0.55 tons is composed of the carbon dioxide released from limestone and minor amounts of other gases released during the calcination process. In this process, the chemical bonds of the raw materials are broken down and then they are recombined into new compounds. The result is called clinker, which are rounded nodules between 1 mm and 25 mm across. The clinker is ground to a fine powder in a cement mill and mixed with gypsum to create cement. The powdered cement is then mixed with water and aggregates to form concrete that is used in construction. Clinker quality depends on raw material composition, which has to be closely monitored to ensure the quality of the cement. Excess free lime, for example, results in undesirable effects such as volume expansion, increased setting time or reduced strength. However, when concrete uses a cement with a high pozzolan content this may not be as critical.

There are four main phases involved in the clinker manufacturing process. Clinker is formed at a high temperature (1,450° C.) in a cement kiln and as shown in the Table 1 below. Additionally, once clinker has cooled it is mixed and ground with gypsum to avoid the flash setting due to the very fast hydration of the tricalcium aluminate ($C_3A$) to prepare the cement powder. Optionally, limestone is added and ground with cement clinker and gypsum as a filler addition to reduce the clinker factor. Alternatively, a pozzolan can also be added to the grinding of clinker or blended with the cement powder once it has been ground with gypsum.

The four compounds or mineral constituents referred as $C_3S$, $C_2S$, $C_3A$ and $C_4AF$ are known as the main crystalline phases of Portland cement. The phase composition of a particular cement clinker can be quantified through a complex set of calculation known as the Bogue formula or equations.

Tables shown in the Examples 2 through 10 below make use of the Bogue equations to calculate various percentages of limestone, iron, alumina and silica corrective minerals and chemical elements necessary to determine the raw meal composition and calculate the clinker composition under the present invention. Tables shown in Examples 12 through 15 make use of a modified Bogue equations to calculate the various percentages of calcium oxide (lime), iron, alumina and silica corrective minerals and chemical elements necessary to determine the raw meal composition and calculate the clinker composition under the present invention.

Typical phases and mineral constituents of clinker plus gypsum found in typical portland cement powder are shown in Table 1 below:

TABLE 1

Typical constituents of portland clinker plus gypsum shown using cement chemist notation (CCN)

| Name | Formula | Mineral Phase | CCN | Mass |
|---|---|---|---|---|
| Tricalcium silicate | $(CaO)_3 \cdot SiO_2$ | Alite | $C_3S$ | 25-50% |
| Dicalcium silicate | $(CaO)_2 \cdot SiO_2$ | Belite | $C_2S$ | 20-45% |
| Tricalcium aluminate | $(CaO)_3 \cdot Al_2O_3$ | Aluminate or Celite | $C_3A$ | 5-12% |
| Tetracalcium aluminoferrite | $(CaO)_4 \cdot Al_2O_3 \cdot Fe_2O_3$ | Ferrite | $C_4AF$ | 6-12% |
| Gypsum | $CaSO_4 \cdot 2\ H_2O$ | | $C\bar{S}H_2$ | 2-10% |

Portland cement can also be analyzed by the oxide composition with value ranges shown in the Table 2 below.

TABLE 2

Typical constituents of portland cement shown using cement chemist notation (CCN)

| Clinker | CCN | Mass |
|---|---|---|
| Calcium oxide, CaO | C | 61-67% |
| Silicon dioxide, $SiO_2$ | S | 19-23% |
| Aluminum oxide, $Al_2O_3$ | A | 2.5-6% |
| Ferric oxide, $Fe_2O_3$ | F | 0-6% |
| Sulfur (VI) oxide, $SO_3$ | S | 1.5-4.5% |

Additionally, the following parameters are calculated in the process of clinker making process:

Lime Saturation Factor (LSF): The Lime Saturation Factor is a ratio of CaO to the other three main oxides. Applied to clinker, it is calculated as: LSF=CaO/$(2.8SiO_2+1.2Al_2O_3+0.65Fe_2O_3)$. Often, this is referred to as a percentage and therefore multiplied by 100. The LSF controls the ratio of alite to belite in the clinker. A clinker with a higher LSF will have a higher proportion of alite to belite than will a clinker with a low LSF. Typical LSF values in modern clinkers are 0.92-0.98, or 92%-98%.

Silica Ratio (SR): The Silica Ratio (also known as the Silica Modulus) is defined as: $SR=SiO_2/(Al_2O_3+Fe_2O_3)$. A high silica ratio means that more calcium silicates are present in the clinker and less aluminate and ferrite. SR is typically between 2.0 and 3.0.

Alumina Ratio (AR) The alumina ratio is defined as: $AR=(Al_2O_3/(Fe_2O_3)$. This determines the potential relative proportions of aluminate and ferrite phases in the clinker. An increase in clinker AR (also sometimes written as A/F) means there will be proportionally more aluminate and less ferrite in the clinker. In ordinary portland cement clinker, the AR is usually between 1 and 4. The above three parameters are those most commonly used. A fourth, the 'Lime Combination Factor' (LCF), is the same as the LSF parameter, but with the clinker free lime content subtracted from the total CaO content. With an LCF=1.0, therefore, the maximum amount of silica is present as $C_3S$.

The typical manufacturing process includes the use of clay, iron, silica and alumina containing minerals sourced in a typical cement manufacturing process from various separate minerals that are almost always found in a crystalline state, that need to be ground and homogenized then heated to a temperature high enough to break the crystalline bonds between the elements that along with the calcium oxide from the limestone calcination process recombine to create clinker by a process of sintering. In the present invention the iron, alumina and silica needed to combine with the limestone or calcium oxide are provided by a single calcium-iron-aluminosilicate mineral containing the iron, alumina and silica in a naturally blended state found in similar proportions that are needed in the manufacture of cement where the calcium-iron-aluminosilicate mineral is partially amorphous. Such a mineral will reduce the sintering temperature, lower the time needed for the sintering process to take place in the kiln, thereby reducing overall emissions and increasing cement production capacity from the same cement plant installation with lower energy cost per ton of clinker produced. Additionally, the calcium-iron-aluminosilicate mineral contains calcium in an un-carbonated state which partially replaces the respective calcium contained in limestone which is bound or combined with carbon dioxide, thereby further reduce carbon emissions.

In another embodiment limestone can be placed into a pre-calciner, such as used in the Leilac France process, with carbon capture process to separate the carbon dioxide from the calcium oxide resulting in lime (calcium oxide). The $CO_2$ is separated from the CaO by calcination prior to mixing with iron, alumina and silica. The pre-calciner uses a process of indirectly heated calcination to simply and efficiently separate unavoidable $CO_2$ process emissions for use or storage. It is energy agnostic and electrification ready, providing flexible and economical pathways to carbon free cement and lime production. This process works by keeping the $CO_2$ that is released from the raw materials pure, rather than trying to separate carbon dioxide from combustion gases, which is the reason carbon capture is traditionally expensive. The CaO (lime) can then be placed into a kiln along with the calcium-alumino-iron-silicate mineral of the present invention and optionally one or more of the iron, alumina and/or silica corrective minerals and heated to the required temperatures of the clinker stages process to create a hydraulic cement clinker such as portland cement clinker. Alternatively, the calcium oxide (lime) can be produced by any means or processes regardless of the carbon capture or not such as conventional lime manufacturing process or any other imaginable process to make lime.

In a further embodiment the raw meal composed of limestone, the calcium-iron-aluminosilicate mineral and optionally use any other iron, alumina and silica corrective mineral can be placed into a pre-calciner that captures the carbon dioxide released by the limestone calcination by a process of indirect heating and carbon dioxide capture. The pre-calcined raw meal can then be placed into a kiln suitable for clinker making process and heated to the required temperatures of the clinker stages process to create a hydraulic cement clinker such as portland cement clinker.

In yet another embodiment limestone can be dissolved in a solution and placed into an electrochemical reactor. The $CO_2$ is then separated from the CaO or $Ca(OH)_2$ by an electrolysis process. The CaO or $Ca(OH)_2$ can then be placed into a kiln along with the calcium-alumino-iron-silicate mineral and optionally minor amounts of iron, alumina and/or silica corrective minerals and heated to the required temperatures of the clinker stages process to create a hydraulic cement clinker such as portland cement clinker.

The $CO_2$ collected from any one of the indirect calcination or electrolysis reactor process can be sequestered or mineralized in any conventional way or as described in U.S. Pat. Nos. 11,884,602 and 11,986,769 and U.S. patent application Ser. No. 18/416,240 filed Jan. 18, 2024 and Ser. No. 18/421,638 filed Jan. 24, 2024 (the disclosures of which are all incorporated herein by reference in their entirety).

Tables 3 and 4 below show chemical oxides analysis of calcium-iron-aluminosilicate mineral, such as hyaloclastite, lava, volcanic ash, or pumice-based minerals from various sources and shows CaO levels as well as the $Fe_2O_3$, MgO, correlated with the $SiO_2$ content. The values of the Ca, Mg, Fe, Na and K oxides shown in Table 3 below are examples of desirable oxide levels for calcium-iron-aluminosilicate used in clinker production in accordance with the present invention.

TABLE 3

Desirable chemical compositions of calcium-iron-aluminosilicate suitable for clinker production

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |

TABLE 3-continued

Desirable chemical compositions of calcium-iron-aluminosilicate suitable for clinker production

| Elements | LS36-10 | TDR | SND | AB | BKP | PVT | RDF | THR | VCR | PTR |
|---|---|---|---|---|---|---|---|---|---|---|
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

TABLE 4

Desirable chemical compositions of calcium-iron-aluminosilicate mineral showing the desired ratios between various elements and sums of various elements

| Sample ID | CaO | MgO | $Al_2O_3$ | $Fe_2O_3$ | $SiO_2$ | Sum of $Al_2O_3$ + $SiO_2$ + $Fe_2O_3$ (%) | Sum of $Al_2O_3$ + $Fe_2O_3$ (%) | Ratio $Al_2O_3$ to $Fe_2O_3$ | Ratio $SiO_2$ to Sum of ($Al_2O_3$ + $Fe_2O_3$) |
|---|---|---|---|---|---|---|---|---|---|
| LS36-10 | 14.77% | 6.11% | 14.09% | 13.07% | 45.20% | 72.36% | 27.16% | 1.08 | 1.66 |
| TDR | 12.70% | 7.27% | 17.60% | 12.90% | 49.50% | 80.00% | 30.50% | 1.36 | 1.62 |
| SND | 11.51% | 10.89% | 15.33% | 12.75% | 48.90% | 76.98% | 28.08% | 1.20 | 1.74 |
| AB | 11.51% | 11.06% | 12.49% | 14.20% | 47.20% | 73.89% | 26.69% | 0.88 | 1.77 |
| BKP | 9.68% | 6.57% | 11.96% | 15.38% | 46.36% | 73.70% | 27.34% | 0.78 | 1.70 |
| PVT | 9.37% | 6.57% | 15.40% | 13.00% | 48.50% | 76.90% | 28.40% | 1.18 | 1.71 |
| RDF | 9.16% | 7.78% | 15.00% | 14.10% | 50.60% | 79.70% | 29.10% | 1.06 | 1.74 |
| THR | 8.94% | 4.94% | 14.53% | 12.03% | 52.85% | 79.41% | 26.56% | 1.21 | 1.99 |
| VCR | 8.84% | 4.93% | 14.87% | 9.85% | 54.94% | 79.66% | 24.72% | 1.51 | 2.22 |
| PTR | 6.69% | 6.37% | 13.05% | 7.21% | 60.39% | 80.65% | 20.26% | 1.81 | 2.98 |

In the samples above all except the PTR samples show desirable properties for the use as a calcium-iron-aluminosilicate mineral to be mixed with limestone, calcium oxide or calcium hydroxide for the manufacture of hydraulic cement clinker such as portland cement clinker in accordance with the present invention.

All samples above are minerals sampled, processed and analyzed by the inventor from various location around the world. The three-letter designation refers to the mineral source.

These samples of a calcium-iron-aluminosilicate mineral show adequate replacement of iron ore, clay and silica mineral currently mixed with limestone, calcium oxide or calcium hydroxide in the manufacture of clinker. These additions are typically chosen as Si/Al/Fe carriers in raw meal mix design. Of relevance is the Al ratio ($Al_2O_3/Fe_2O_3$) preferably close to 1 and more preferably approximately 0.75 to approximately 1.5, signifying that the use of this material will not increase both the amount of tricalcium aluminate (C3A) in clinker and the associated durability risks in the presence of sulfate environments in concrete applications. Additionally, the high $Fe_2O_3$ concentration, particularly in an amorphous or partially amorphous state, will promote melt phase formation at lower temperature, improving burnability and reducing dusting at the kiln inlet as well as reducing the kiln processing time. This in turn reduces energy consumption and increases the output of the clinker production line.

It is also important to have a low Si ratio to the sum of Fe and Al ($SiO_2/(Fe_2O_3+Al_2O_3)$) preferably of approximately 1.5, or more preferably approximately 1.25 to approximately 2.25 which will improve burnability as well and promote formation of tricalcium silicate (C3S) vs dicalcium silicate (C2S) in clinker. The improvement of burnability will decrease specific energy consumption of clinker burning, hence decreased $CO_2$ and $NO_x$ emissions from burning less fuel.

"Burnability" or "combinability" is a measure of how easily the raw materials react with each other for the formation of clinker from the raw meal. Coatability of a raw meal is related to its burnability also. With hard burning material, the coatability is low. It is actually measured by the free or nonreactive CaO % in the clinker. Because the iron, alumina and silica are already proportioned and combined in ideal ratios in a lava chamber pre-eruption, the calcium-iron-aluminosilicate mineral with the properties disclosed herein makes it easier to combine with the limestone or CaO component to form a hydraulic cement clinker compared with minerals used to provide the iron, alumina and silica from separate minerals in a conventional clinker manufacturing process.

The mineral in accordance with the present invention also contains good amounts of CaO, preferably approximately 4% to approximately 25%, most preferably as un-carbonated Ca, or a combination of un-carbonated and carbonated Ca, thus proportionally reducing $CO_2$ emissions from the kiln stack.

The sodium equivalent ($Na_2O+0.658K_2O$) of the mineral in accordance with the present invention may be relatively high, but not much different from a conventional clay; however, this amount should be taken in due consideration based on the actual replacement rate of the material in the raw mix, and therefore the actual increase of alkali in the clinker, and specific requirements for use in presence of reactive aggregates (low-alkali cement). If the local practice in concrete design foresees use of fly ash in the mix, it is a proven fact that 25% class-F fly ash is able to counteract any harmful effect of soluble alkali. In case of use of high-sulfur fuels, one can help combine excess of sulfur in clinker and prevent sulfur recirculation in the kiln.

The same approach applies for MgO content, in presence of limiting standard prescriptions to prevent presence of periclase crystals in clinker and the associated risk of expansion during hydration. It is likely that the replacement rate of the material in the raw mix and its grindability will not foster periclase formation.

Mineralogy XRD data confirms same of the above mentioned, namely practical absence of quartz. The absence of quartz has an additional positive impact, in conjunction with the sandy nature of the quartz material used in current practice. Quartz is a hard mineral requiring high and specific grinding energy in raw meal production. The calcium-iron-aluminosilicate mineral contains CaO that is distributed between amorphous, carbonates and feldspars, which in turn will contribute to decreasing $CO_2$ emissions during clinker burning more than half of the material consists of amorphous compounds, having an impact on specific energy consumption of raw mills, proportional to the addition rate of the material in the raw mix.

The use of this material should be preferred to a mix of correctives where each component serves as an individual carrier of one main element, because the presence of finely distributed main elements in the same material makes solid state reactions easier to take place without the need of excessive grinding fineness; the absence of quartz, when compared to natural sand addition, has a similar positive effect on burnability and reduction of specific heat consumption There are multiple effects induced by the presence of quartz. One is due to the very stable large crystal structure, so formation of calcium silicates can be more difficult and requires either higher fineness to increase specific surface and improve solid state reactions to the fullest, or more energy in the kiln (burning T or residence time) or both; another is the quartz hardness which requires more grinding energy; there might also be a problem of higher wear on transport and grinding media, but for small additions this is rather speculative.

The first three samples in Table 3 and 4 above, LS36-10, TDR and SND, show a basaltic chemistry with the $SiO_2$ of approximately 45-47% and $Al_2O_3$ of 14-17.6% this results in a total silica and alumina content of 59.29-63.03%

The next three samples, AB, BKP and PVT, have similar basaltic chemical composition of total silica and alumina of 59.69-63.9% and a total amount of uncarbonated calcium, magnesium and iron oxides of 28.94-34.61%.

The next two samples, RDF and THR, have similar basaltic chemical composition of total silica and alumina slightly higher of 65.6-67.38% and a total amount of uncarbonated calcium, magnesium and iron oxides of 25.91-27.14%.

The next sample, VCR, has an intermediate chemical composition of total silica and alumina slightly higher of 69.81%

The last sample, PTR, has an andesitic chemical composition of total silica and alumina slightly higher of 73.44%

Chemical composition as reported herein is measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

In case of the calcium-iron-aluminosilicate mineral such as hyaloclastites, lava, gabbro, scoria, volcanic ashes, pumice, etc., they may contain some degree of crystalline elements, the calcium, iron, alumina, silicates, and other elements are contained in micro-crystals, such as clinopyroxene $Ca(Mg,Fe,Al,Ti)(Si,Al)_2O_6$, calcium plagioclase feldspars $(Na,Ca)Al(Si,Al)_3O_8$, olivine $(Fe,Mg)_2SiO_4$ are examples of crystalline materials that contain uncarbonated elements, such as calcium, magnesium, potassium, sodium and iron, that are available to combine with CaO from the limestone calcination process of clinker manufacturing process to create clinker with reduced emissions and reduced energy consumption in accordance with this present invention. The calcium, iron, aluminum, silica elements, and others, can be found in metamorphic rocks, lava, gabbro, scoria, volcanic ashes, pumices and hyaloclastites of these chemistries can be in amorphous or microcrystalline form or a combination thereof.

Table 5 below shows examples of calcium-iron-aluminosilicate mineral, such as hyaloclastites, lava, gabbro, scoria, volcanic ashes, or pumices or any other igneous or metamorphic rock, or a man-made mineral, that contains various amounts of amorphous and crystalline content. Samples 14 and 15 are rhyolitic glass such as perlite and the CaO content is below 1% compared with the basaltic in samples 1-13 where CaO ranges between 9-16%.

TABLE 5

|   | "Amorphous" | Clinopyroxene Ca(Mg, Fe, Al, Ti) (Si, Al)2O6 | Plagioclase Feldspar (Na, Ca)Al(Si, Al)3O8 | Olivine (Fe, Mg)2SiO4 | Calcite | Unidentified |
|---|---|---|---|---|---|---|
| 1 | >70 | — | 12 | 5 | 7 | <5 |
| 2 | >80 |   | 10 | <5 | — | <5 |
| 3 | >70 | <3? | 11 | <5 | — | <5 |
| 4 | >80 | — | 13 | <3 | — | <5 |

TABLE 5-continued

| | "Amorphous" | Clinopyroxene Ca(Mg, Fe, Al, Ti) (Si, Al)2O6 | Plagioclase Feldspar (Na, Ca)Al(Si, Al)3O8 | Olivine (Fe, Mg)2SiO4 | Calcite | Unidentified |
|---|---|---|---|---|---|---|
| 5 | >55 | | 12 | 5 | 20 | <5 |
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 | | <5 |
| 10 | >30 | 25 | 43 | 5 | | <5 |
| 11 | >55 | | 15 | 5 | 15 | <5 |
| 12 | >40 | 17 | 37 | 4 | 1 | <5 |
| 13 | >70 | — | 15 | 8 | | <5 |
| 14 | >95 | | | | | <5 |
| 15 | >95 | | | | | <5 |

Samples 1 to 13 in Table 5 above have desirable amorphous and crystalline compositions for use in accordance with the present invention for forming portland cement clinker.

In one disclosed embodiment of the present invention, the calcium-iron-aluminosilicate mineral to be used in conjunction with limestone, calcium oxide or calcium hydroxide for the manufacture of clinker, such as hyaloclastite, lava, gabbro, scoria, volcanic ash or pumice, or any other igneous or metamorphic rock, or a man-made calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5.

In addition to the foregoing, other compounds can be present in small amounts, such as $K_2O$, $TiO_2$, $P_2O_5$, MnO, various metals, rare earth trace elements and other unidentified elements. When combined, these other compounds represent less than 10% by weight of the total chemical composition of the calcium-iron-aluminosilicate mineral such as hyaloclastite, lava, gabbro, scoria, volcanic ash or pumice or any other igneous or metamorphic rock, or a man-made mineral calcium-iron-aluminosilicate mineral.

In another disclosed embodiment, the calcium-iron-aluminosilicate mineral such as hyaloclastite, lava, gabbro, scoria, volcanic ash or pumice or any other igneous or metamorphic rock, or a man-made calcium-iron-aluminosilicate mineral in accordance with the present invention preferably has a density or specific gravity of approximately 2.4 to approximately 3.1.

The calcium-iron-aluminosilicate mineral in accordance with the present invention can be in crystalline or amorphous (glassy) form and is usually found as a combination of both in varying proportions. Preferably, the hyaloclastite, volcanic ash or pumice in accordance with the present invention comprises approximately 0% to 100% by weight amorphous form, more preferably approximately 10% to approximately 80% by weight amorphous form, most preferably approximately 20% to approximately 60% by weight amorphous form, especially approximately 30% to approximately 50% by weight amorphous form. The crystalline portion of hyaloclastite, sideromelane or tachylite preferably comprises approximately 3% to approximately 20% by weight olivine, approximately 5% to approximately 40% by weight clinopyroxene, approximately 5% to approximately 60% by weight plagioclase, and approximately 0% to approximately 40% (or less than 40%) by weight other minerals including, but not limited to, magnetite, UlvoSpinel, quartz, feldspar, pyrite, illite, hematite, chlorite, calcite, hornblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values.

Depending on the type of fuel used to heat the clinker making kiln and other factors such as minor constituents found in the components of the raw meal minerals, and to meet certain standards of emissions or clinker specifications that may vary from plant to plant and from jurisdiction to jurisdiction, a variety of compounds may be used to correct any one of the elements in the final composition of the clinker and or the composition of the exhaust gases such as emissions. These compounds may be combined with the raw meal, combined with the fuel or injected into the kiln at various kiln locations and by various means depending on the specific needs and conditions needed to be met, among them carbon capture and the like. These optional processes may be known in the art and some may still have yet to be developed and the rules and regulations affecting the cement industry are under constant review and update. These minor compounds or corrective means to meet product standards and emissions are not the subject of this invention but may be incorporated into the present invention without altering these teachings.

The following examples are illustrative of selected embodiments of the present invention and are not intended to limit the scope of the invention. All percentages used herein are percent by weight unless specifically stated otherwise.

Example 1

Limestone is mined from a quarry and delivered to a portland cement plant where it is ground to a fine particle size suitable for a clinker manufacture process. A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5. is ground to a particle size similar to the ground limestone. The ground limestone and calcium-iron-aluminosilicate mineral are blended together, in a ratio of approximately 75% limestone and approximately 25% calcium-iron-aluminosilicate mineral. The blended composition is then preheated and then fed into a calcining clinker kiln typical for the clinker manufacture. The kiln is fired to a temperature of approximately 1250 to 1400° C. and the blended composition is kept in the kiln for a period of time sufficient for the production of clinker with the various clinker phases such as one or more of the Tricalcium silicate $(CaO)_3 \cdot SiO_2$, also known as $C_3S$, Dicalcium silicate $(CaO)_2 \cdot SiO_2$, also known as $C_2S$, Tricalcium aluminate $(CaO)_3 \cdot Al_2O_3$, also known as $C_3A$ Tetracalcium aluminoferrite $(CaO)_4 \cdot Al_2O_3 \cdot Fe_2O_3$ also known as $C_4AF$. The clinker resulting from this process is then allowed to cool sufficiently to be fed into a grinding mill and ground into a hydraulic cement powder and can optionally be mixed with gypsum.

Example 2—Prior Art

A portland cement plant is designed to produce approximately 650,000 tons of portland cement using the conventional method to make portland cement where limestone is mixed with a corrective iron, alumina and silica mineral each with its own chemical and mineral properties. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 6 below. The raw meal clinker target composition is shown in column 8. The calculated clinker target composition and properties are shown in Tables 7 and 8 below. The source of the iron is provided by an iron slag with the chemical composition shown in column 3. The source of alumina is provided by a clay with the chemical properties shown in column 4. The source of silica is provided by a quartz sand with the chemical composition shown in column 5. To meet the target raw meal chemical composition shown in column 7 and the clinker chemical composition shown in Tables 7 and 8 the iron, alumina and silica corrective percentages and quantities are shown in columns 3, 4 and 5. The 1 million tons of raw meal is now composed of 84.70 percent limestone, 1 percent of iron slag, 4.80 percent alumina clay and 9.50 percent of quartz sand such that 847,000 tons of limestone, 10,000 tons of iron slag, 48,000 tons of alumina clay and 95,000 tons of silica sand are required. The limestone, iron slag, alumina clay and silica sand are ground to the target particle size, mixed and fed into a conventional portland cement clinker kiln. As the raw meal travels from one end of the kiln to the hot end of the kiln, the limestone is calcined and the iron, alumina and silica sinter with the calcium oxide derived from the limestone calcination to form hydraulic cement clinker. The clinker resulting from this process is then allowed to cool sufficiently to be fed into a grinding mill and ground into a hydraulic cement powder and can optionally be mixed with gypsum.

TABLE 6

| 1<br>Material | 2<br>Limestone | 3<br>Iron<br>Corrective | 4<br>Alumina<br>Corrective | 5<br>Silica<br>Corrective | 6<br>Calculated<br>Raw meal | 7<br>Raw<br>meal<br>target |
|---|---|---|---|---|---|---|
| Dosage wet [ %] | 84.70 | 1.00 | 4.80 | 9.50 | 100.00 | 1,000,000 |
| Dosage dry [%] | 84.70 | 1.00 | 4.80 | 9.50 | 100.00 | |
| Dosage wet [t] | 847,000 | 10,000 | 48,000 | 95,000 | 1,000,000 | |
| Dosage dry [t] | 847,000 | 10,000 | 48,000 | 95,000 | 1,000,000 | |
| Chemical Analysis | | | | | | |
| LOI | 41.61 | −6.57 | 13.44 | 0.11 | 35.83 | 34.00 |
| $SiO_2$ | 4.16 | 2.67 | 21.97 | 99.28 | 14.04 | 14.00 |
| $Al_2O_3$ | 1.12 | 0.40 | 45.15 | 0.272 | 3.15 | 4.00 |
| $Fe_2O_3$ | 0.3 | 99.41 | 15.70 | 0.052 | 2.01 | 3.00 |
| $TiO_2$ | 0.04 | 0.02 | 2.34 | | 0.15 | 0.20 |
| CaO | 51.06 | 1.06 | 0.56 | 0.026 | 43.29 | 42.00 |
| MgO | 0.42 | 0.20 | 0.00 | 0.04 | 0.36 | 1.20 |
| $SO_3$ | 0.08 | 0.04 | 0.04 | | 0.07 | 0.10 |
| $Na_2O$ | 0.03 | 0.26 | 0.00 | 0.004 | 0.03 | 0.27 |
| $K_2O$ | 0.44 | 0.00 | 0.18 | 0.127 | 0.39 | 0.43 |
| Cl | | | | | 0.000 | 0.01 |
| F | | | | | 0.000 | 0.00 |
| $P_2O_5$ | 0.02 | 0.02 | 0.13 | | 0.023 | 0.06 |
| $Mn_2O_3$ | | | | | 0.000 | 0.07 |
| TOTALS | 99.28 | 97.52 | 99.52 | 99.91 | 99.33 | 99.34 |

The clinker produced in accordance with the present inventions will therefore have the following calculated chemical composition as shown in Table 7 below,

TABLE 7

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 21.88 | 4.90 | 3.13 | 0.23 | 67.46 | 0.56 | 0.11 | 0.04 | 0.61 | 0.00 | 0.00 | 0.04 | 0.00 |

Additionally, the clinker has the following calculated mineral properties as shown in Table 8 below.

TABLE 8

| Limestone Saturation Factor | Silica Ratio | Alumina Ratio | Na2O Equivalent | C3A | C4AF | C4AF + 2C3A |
|---|---|---|---|---|---|---|
| 98.23 | 2.72 | 1.57 | 0.45 | 7.70 | 9.51 | 24.91 |

Example 3

A portland cement plant is designed to produce approximately 650,000 tons of portland cement using the method described in accordance with the present invention, To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 9 below. The raw meal clinker target composition is shown in column 8. The calculated clinker target composition and properties are shown in Tables 10 and 11 below. The source of the iron, alumina and silica is provided by the calcium-iron-alumina-silicate in the form of basaltic hyaloclastite LS18-1 10, with a chemical composition shown in column 3 and an amorphous content of 70 percent. The sum of calcium, iron, alumina and silica needed to meet the target raw meal composition found in the limestone from column 2 and hyaloclastite from column 3 meets the requirement of alumina of the target raw meal shown in column 8 and therefore no corrective alumina is needed as "zero" is shown in column 5. A small amount of iron corrective is needed in the form of iron oxide having the chemical composition shown in column 4. Additionally, to meet the raw meal target amount of silica shown in column 8, as small amount of silica corrective in the form of quartz sand material is added having the chemical composition shown in column 6. The 1 million tons of raw meal is now composed of 81.40 percent limestone, 16 percent of basaltic hyaloclastite, 0.60 percent of iron slag and 2.6 percent of quartz sand such that 814,000 tons of limestone, 160,000 tons of basaltic hyaloclastite and 26,000 tons of silica sand are required. The limestone, basaltic hyaloclastite, iron slag and silica sand are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite sinter with the calcium oxide derived from the limestone calcination to form hydraulic cement clinker. The limestone, iron slag and quartz sand used in this example have the same properties as the limestone, iron slag and quartz sand used in Example 2 above, Compared with the conventional clinker manufacturing process from Example 2, there are an estimated 33,000 tons of limestone less being used in the process resulting in approximately 20.000 ton of $CO_2$ not being emitted and therefore not having to be sequestered or mineralized

TABLE 9

| 1 Material | 2 Limestone | 3 LS 18-1 10 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 81.40 | 16.00 | 0.00 | 0.00 | 2.60 | 100.00 | 1,000,000 |
| Dosage dry [%] | 81.40 | 16.00 | 0.00 | 0.00 | 2.60 | 100.00 | |
| Dosage wet [t] | 814,000 | 160,000 | 0 | 0 | 26,000 | 1,000,000 | |
| Dosage dry [t] | 814,000 | 160,000 | 0 | 0 | 26,000 | 1,000,000 | |
| Chemical Analysis | | | | | | | |
| LOI | 41.61 | 1 | −6.57 | 13.44 | 0.11 | 34.03 | 35.30 |
| $SiO_2$ | 4.16 | 48.8 | 2.67 | 21.97 | 99.28 | 13.78 | 14.25 |
| $Al_2O_3$ | 1.12 | 15 | 0.40 | 45.15 | 0.272 | 3.32 | 3.00 |
| $Fe_2O_3$ | 0.3 | 13.5 | 99.41 | 15.70 | 0.052 | 2.41 | 2.00 |
| $TiO_2$ | 0.04 | 1.58 | 0.02 | 2.34 | | 0.29 | 0.20 |
| CaO | 51.06 | 8.85 | 1.06 | 0.56 | 0.026 | 42.98 | 43.00 |
| MgO | 0.42 | 5.9 | 0.20 | 0.00 | 0.04 | 1.29 | 1.20 |
| $SO_3$ | 0.08 | | 0.04 | 0.04 | | 0.07 | 0.10 |
| $Na_2O$ | 0.03 | 3.59 | 0.26 | 0.00 | 0.004 | 0.60 | 0.27 |
| $K_2O$ | 0.44 | 1.21 | 0.00 | 0.18 | 0.127 | 0.56 | 0.43 |
| Cl | | | | | | 0.000 | 0.01 |
| F | | | | | | 0.000 | 0.00 |
| $P_2O_5$ | 0.02 | 0.34 | 0.02 | 0.13 | | 0.071 | 0.06 |
| $Mn_2O_3$ | | | | | | 0.000 | 0.07 |
| TOTALS | 99.28 | 99.77 | 97.52 | 99.52 | 99.91 | 99.37 | 99.89 |

The clinker produced in accordance with the present inventions will therefore have the following calculated chemical composition as shown in Table 10 below.

TABLE 10

| SiO$_2$ | Al$_2$O$_3$ | Fe$_2$O$_3$ | TiO$_2$ | CaO | MgO | SO$_3$ | Na$_2$O | K$_2$O | Cl | F | P$_2$O$_5$ | Mn$_2$O$_3$ |
|---|---|---|---|---|---|---|---|---|---|---|---|---|
| 20.88 | 5.03 | 3.65 | 0.43 | 65.15 | 1.95 | 0.10 | 0.91 | 0.84 | 0.0 | 0.0 | 0.11 | 0.00 |

Additionally, the clinker has the following calculated mineral properties as shown in Table 11 below.

TABLE 11

| Limestone Saturation Factor | Silica Ratio | Alumina Ratio | Na2O Equivalent | C3A | C4AF | C4AF + 2C3A |
|---|---|---|---|---|---|---|
| 98.16 | 2.41 | 1.38 | 1.46 | 7.16 | 11.09 | 25.41 |

Example 4

A portland cement plant is designed to produce approximately 650,000 tons of portland cement using the method described in accordance with the present invention. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 12 below. The raw meal clinker target composition is shown in column 8. The calculated clinker target composition is shown in Tables 13 and 14 below. The source of the iron, alumina and silica is provided by the calcium-iron-aluminosilicate in the form of basaltic hyaloclastite LS18-1 10, with a chemical composition shown in column 3 and an amorphous content of 70 percent. The sum of calcium, iron, alumina and silica needed to meet the target raw meal composition found in the limestone from column 2 and hyaloclastite from column 3 meets the requirement of alumina, iron and silica of the target raw meal shown in column 8 and therefore no corrective alumina, iron, or silica is needed as "zero" shown in column 4, 5 and 6. The 1 million tons of raw meal is now composed of 79 percent limestone, 21 percent of basaltic hyaloclastite such that 790,000 tons of limestone and 210,000 tons of basaltic hyaloclastite are required. The limestone and basaltic hyaloclastite are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite sinter with the calcium oxide derived from the limestone calcination to form hydraulic cement clinker. The limestone used in this example have the same properties as the used in Example 2 above. Compared with the conventional clinker manufacturing process from Example 2, there are an estimated 57,000) tons of limestone less being used in the process resulting in approximately 33,000) ton of CO$_2$ not being emitted and therefore not having to be sequestered or mineralized.

TABLE 12

| 1 Material | 2 Limestone | 3 LS 18-1 10 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 79.00 | 21.00 | 0.00 | 0.00 | 0.00 | 100.00 | 1,000,000 |
| Dosage dry [%] | 79.00 | 21.00 | 0.00 | 0.00 | 0.00 | 100.00 | |
| Dosage wet [t] | 790,000 | 210,000 | 0 | 0 | 0 | 1,000,000 | |
| Dosage dry [t] | 790,000 | 210,000 | 0 | 0 | 0 | 1,000,000 | |
| Chemical Analysis | | | | | | | |
| LOI | 41.61 | 1 | −6.57 | 13.44 | 0.11 | 33.08 | 34.00 |
| SiO$_2$ | 4.16 | 48.8 | 2.67 | 21.97 | 99.28 | 13.53 | 13.50 |
| Al$_2$O$_3$ | 1.12 | 15 | 0.40 | 45.15 | 0.272 | 4.03 | 4.00 |
| Fe$_2$O$_3$ | 0.3 | 13.5 | 99.41 | 15.70 | 0.052 | 3.07 | 3.00 |
| TiO$_2$ | 0.04 | 1.58 | 0.02 | 2.34 | | 0.36 | 0.20 |
| CaO | 51.06 | 8.85 | 1.06 | 0.56 | 0.026 | 42.20 | 43.00 |
| MgO | 0.42 | 5.9 | 0.20 | 0.00 | 0.04 | 1.57 | 1.20 |
| SO$_3$ | 0.08 | | 0.04 | 0.04 | | 0.06 | 0.10 |
| Na$_2$O | 0.03 | 3.59 | 0.26 | 0.00 | 0.004 | 0.78 | 0.27 |
| K$_2$O | 0.44 | 1.21 | 0.00 | 0.18 | 0.127 | 0.60 | 0.43 |
| Cl | | | | | | 0.000 | 0.01 |
| F | | | | | | 0.000 | 0.00 |
| P$_2$O$_5$ | 0.02 | 0.34 | 0.02 | 0.13 | | 0.087 | 0.06 |
| Mn$_2$O$_3$ | | | | | | 0.000 | 0.07 |
| TOTALS | 99.28 | 99.77 | 97.52 | 99.52 | 99.91 | 99.38 | 99.84 |

The clinker produced in accordance with the present inventions will therefore have the following calculated chemical composition as shown in Table 13 below.

TABLE 13

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.23 | 6.03 | 4.59 | 0.54 | 63.06 | 2.35 | 0.09 | 1.16 | 0.90 | 0.0 | 0.0 | 0.13 | 0.00 |

Additionally, the clinker has the following calculated mineral properties as shown in Table 14 below.

TABLE 14

| Limestone Saturation Factor | Silica Ratio | Alumina Ratio | Na2O Equivalent | C3A | C4AF | C4AF + 2C3A |
|---|---|---|---|---|---|---|
| 95.18 | 1.90 | 1.31 | 1.75 | 8.21 | 13.96 | 30.38 |

Example 5

A portland cement plant is designed to produce approximately 650,000 tons of portland cement using the method described in accordance with the present invention. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 15 below. The raw meal clinker target composition is shown in column 8. The calculated clinker target composition is shown in Tables 16 and 17 below. The source of the iron, alumina and silica is provided by the calcium-iron-alumina-silicate in the form of basaltic hyaloclastite LS36-2 20, with a chemical composition shown in column 3 and an amorphous content of 60 percent. The sum of calcium, iron, alumina and silica needed to meet the target raw meal composition found in the limestone from column 2 and hyaloclastite from column 3 meets the requirement of iron and alumina of the target raw meal shown in column 8 and therefore no corrective iron and alumina is needed as "zero" shown in column 4 and 5. Additionally to meet the raw meal target amount of silica shown in column 8, as small amount of silica corrective in the form of quartz sand material is added having the chemical composition shown in column 6. The 1 million tons of raw meal is now composed of 80 percent limestone, 17 percent of basaltic hyaloclastite and 3 percent of quartz sand such that 800,000 tons of limestone, 170,000 tons of basaltic hyaloclastite and 30,000 tons of silica sand are required. The limestone, basaltic hyaloclastite and silica sand are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite along with the silica from the quartz sand sinter with the calcium oxide derived from the limestone calcination to form hydraulic cement clinker. The limestone, and quartz sand used in this example have the same properties as the limestone and quartz sand used in Example 2 above. Compared with the conventional clinker manufacturing process from Example 2, there are an estimated 47.000 tons of limestone less being used in the process resulting in approximately 27,500 ton of $CO_2$ not being emitted and therefore not having to be sequestered or mineralized.

TABLE 15

| 1 Material | 2 Limestone | 3 LS 36-2 20 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 80.00 | 17.00 | 0.00 | 0.00 | 3.00 | 100.00 | 1,000,000 |
| Dosage dry [%] | 80.00 | 17.00 | 0.00 | 0.00 | 3.00 | 100.00 | |
| Dosage wet [t] | 800,000 | 170,000 | 0 | 0 | 30,000 | 1,000,000 | |
| Dosage dry [t] | 800,000 | 170,000 | 0 | 0 | 30,000 | 1,000,000 | |
| Chemical Analysis | | | | | | | |
| LOI | 41.61 | 3 | −6.57 | 13.44 | 0.11 | 33.80 | 35.30 |
| $SiO_2$ | 4.16 | 44.4 | 2.67 | 21.97 | 99.28 | 13.85 | 14.25 |
| $Al_2O_3$ | 1.12 | 12.7 | 0.40 | 45.15 | 0.272 | 3.06 | 3.00 |
| $Fe_2O_3$ | 0.3 | 12.2 | 99.41 | 15.70 | 0.052 | 2.32 | 2.00 |
| $TiO_2$ | 0.04 | 1.64 | 0.02 | 2.34 | | 0.31 | 0.20 |
| CaO | 51.06 | 15.6 | 1.06 | 0.56 | 0.026 | 43.50 | 43.00 |
| MgO | 0.42 | 5.76 | 0.20 | 0.00 | 0.04 | 1.32 | 1.20 |
| $SO_3$ | 0.08 | | 0.04 | 0.04 | | 0.06 | 0.10 |
| $Na_2O$ | 0.03 | 3.24 | 0.26 | 0.00 | 0.004 | 0.57 | 0.27 |
| $K_2O$ | 0.44 | 1.08 | 0.00 | 0.18 | 0.127 | 0.54 | 0.43 |
| Cl | | | | | | 0.000 | 0.01 |
| F | | | | | | 0.000 | 0.00 |
| $P_2O_5$ | 0.02 | 0.34 | 0.02 | 0.13 | | 0.074 | 0.06 |
| $Mn_2O_3$ | | | | | | 0.000 | 0.07 |
| TOTALS | 99.28 | 99.96 | 97.52 | 99.52 | 99.91 | 99.41 | 99.89 |

The clinker produced in accordance with the present inventions will therefore have the following calculated chemical composition as shown in Table 16 below.

TABLE 16

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 21.25 | 4.62 | 3.49 | 0.47 | 65.42 | 1.98 | 0.10 | 0.87 | 0.81 | 0.0 | 0.0 | 0.11 | 0.00 |

Additionally, the clinker has the following calculated mineral properties as shown in Table 17 below.

TABLE 17

| Limestone Saturation Factor | Silica Ratio | Alumina Ratio | Na2O Equivalent | C3A | C4AF | C4AF + 2C3A |
|---|---|---|---|---|---|---|
| 97.84 | 2.62 | 1.32 | 1.40 | 6.33 | 10.61 | 23.27 |

Example 6

A portland cement plant is designed to produce approximately 650,000 tons of portland cement using the method described in accordance with the present invention. To produce 650.000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 18 below. The raw meal clinker target composition is shown in column 8. The calculated clinker target composition is shown in Table 19 and 20 below. The source of the iron, alumina and silica is provided by the calcium-iron-alumina-silicate in the form of basaltic hyaloclastite LS36-2 20, with a chemical composition shown in column 3 and an amorphous content of 60 percent. The sum of calcium, iron, alumina and silica needed to meet the target raw meal composition found in the limestone from column 2 and hyaloclastite from column 3 meets the requirement of iron, alumina and silica of the target raw meal shown in column 8 and therefore no corrective iron, alumina and silica is needed as "zero" shown in column 4, 5 and 6. The 1 million tons of raw meal is now composed of 77 percent limestone and 23 percent of basaltic hyaloclastite such that 770,000 tons of limestone and 230,000 tons of basaltic hyaloclastite are required. The limestone and basaltic hyaloclastite are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite sinter with the calcium oxide derived from the limestone calcination to form hydraulic cement clinker. The limestone used in this example have the same properties as the limestone used in Example 2 above. Compared with the conventional clinker manufacturing process from Example 2, there are an estimated 77,000 tons of limestone less being used in the process resulting in approximately 45,000 tons of $C_2$ not being emitted and therefore not having to be sequestered or mineralized.

TABLE 18

| 1 Material | 2 Limestone | 3 LS 36-2 20 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 77.00 | 23.00 | 0.00 | 0.00 | 0.00 | 100.00 | 1,000,000 |
| Dosage dry [%] | 77.00 | 23.00 | 0.00 | 0.00 | 0.00 | 100.00 | |
| Dosage wet [t] | 770,000 | 230,000 | 0 | 0 | 0 | 1,000,000 | |
| Dosage dry [t] | 770,000 | 230,000 | 0 | 0 | 0 | 1,000,000 | |
| Chemical Analysis | | | | | | | |
| LOI | 41.61 | 3 | −6.57 | 13.44 | 0.11 | 32.73 | 35.30 |
| $SiO_2$ | 4.16 | 44.4 | 2.67 | 21.97 | 99.28 | 13.42 | 14.25 |
| $Al_2O_3$ | 1.12 | 12.7 | 0.40 | 45.15 | 0.272 | 3.78 | 3.00 |
| $Fe_2O_3$ | 0.3 | 12.2 | 99.41 | 15.70 | 0.052 | 3.04 | 2.00 |
| $TiO_2$ | 0.04 | 1.64 | 0.02 | 2.34 | | 0.41 | 0.20 |
| CaO | 51.06 | 15.6 | 1.06 | 0.56 | 0.026 | 42.90 | 43.00 |
| MgO | 0.42 | 5.76 | 0.20 | 0.00 | 0.04 | 1.65 | 1.20 |
| $SO_3$ | 0.08 | | 0.04 | 0.04 | | 0.06 | 0.10 |
| $Na_2O$ | 0.03 | 3.24 | 0.26 | 0.00 | 0.004 | 0.77 | 0.27 |
| $K_2O$ | 0.44 | 1.08 | 0.00 | 0.18 | 0.127 | 0.59 | 0.43 |
| Cl | | | | | | 0.000 | 0.01 |
| F | | | | | | 0.000 | 0.00 |
| $P_2O_5$ | 0.02 | 0.34 | 0.02 | 0.13 | | 0.094 | 0.06 |
| $Mn_2O_3$ | | | | | | 0.000 | 0.07 |
| TOTALS | 99.28 | 99.96 | 97.52 | 99.52 | 99.91 | 99.44 | 99.89 |

The clinker produced in accordance with the present inventions will therefore have the following calculated chemical composition as shown in Table 19 below.

TABLE 19

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 19.94 | 5.62 | 4.51 | 0.61 | 63.78 | 2.45 | 0.09 | 1.14 | 0.87 | 0.0 | 0.0 | 0.14 | 0.00 |

Additionally, the clinker has the following calculated mineral properties as shown in Table 20 below.

TABLE 20

| Limestone Saturation Factor | Silica Ratio | Alumina Ratio | Na2O Equivalent | C3A | C4AF | C4AF + 2C3A |
|---|---|---|---|---|---|---|
| 98.18 | 1.97 | 1.25 | 1.72 | 7.27 | 13.72 | 28.26 |

Example 7

A portland cement plant is designed to produce approximately 650,000 tons of portland cement using the method described in accordance with the present invention. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 21 below. The raw meal clinker target composition is shown in column 8. The calculated clinker target composition is shown in Tables 22 and 23 below. The source of the iron, alumina and silica is provided by the calcium-iron-alumina-silicate in the form of basaltic hyaloclastite STP, with a chemical composition shown in column 3 and an amorphous content of 90 percent. The sum of calcium, iron and alumina needed to meet the target raw meal composition found in the limestone from column 2 and hyaloclastite from column 3 meets the requirement of iron and alumina of the target raw meal shown in column 8 and therefore no corrective iron and alumina is needed as "zero" shown in column 4 and 5. Additionally to meet the raw meal target amount of silica shown in column 8, as small amount of silica corrective in the form of quartz sand material is added having the chemical composition shown in column 6. The 1 million tons of raw meal is now composed of 80 percent limestone, 18 percent of basaltic hyaloclastite and 2 percent of quartz sand such that 800.000 tons of limestone, 180,000 tons of basaltic hyaloclastite and 20.000 tons of silica sand are required. The limestone, basaltic hyaloclastite and silica sand are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite along with the silica from the quartz sand sinter with the calcium oxide derived from the limestone calcination to form hydraulic cement clinker. The limestone and silica used in this example have the same properties as the limestone and silica used in Example 2 above. Compared with the conventional clinker manufacturing process from Example 2, there are an estimated 47.000 tons of limestone less being used in the process resulting in approximately 27,000 tons of $CO_2$ not being emitted and therefore not having to be sequestered or mineralized.

TABLE 21

| 1<br>Material | 2<br>Limestone | 3<br>STP | 4<br>Iron Corrective | 5<br>Alumina Corrective | 6<br>Silica Corrective | 7<br>Calculated Raw meal | 8<br>Raw meal target |
|---|---|---|---|---|---|---|---|
| Dosage wet [ %] | 80.00 | 18.00 | 0.00 | 0.00 | 2.00 | 100.00 | |
| Dosage dry [%] | 80.00 | 18.00 | 0.00 | 0.00 | 2.00 | 100.00 | |
| Dosage wet [t] | 800,000 | 180,000 | 0 | 0 | 20,000 | 1,000,000 | |
| Dosage dry [t] | 800,000 | 180,000 | 0 | 0 | 20,000 | 1,000,000 | 1,000,000 |
| Chemical Analysis | | | | | | | |
| LOI | 41.61 | 1.5 | −6.57 | 13.44 | 0.11 | 33.56 | 35.30 |
| $SiO_2$ | 4.16 | 46.98 | 2.67 | 21.97 | 99.28 | 13.77 | 14.25 |
| $Al_2O_3$ | 1.12 | 13.53 | 0.40 | 45.15 | 0.272 | 3.34 | 3.00 |
| $Fe_2O_3$ | 0.3 | 11.86 | 99.41 | 15.70 | 0.052 | 2.38 | 2.00 |
| $TiO_2$ | 0.04 | 1.56 | 0.02 | 2.34 | | 0.31 | 0.20 |
| CaO | 51.06 | 11.45 | 1.06 | 0.56 | 0.026 | 42.91 | 43.00 |
| MgO | 0.42 | 9.89 | 0.20 | 0.00 | 0.04 | 2.12 | 1.20 |
| $SO_3$ | 0.08 | | 0.04 | 0.04 | | 0.06 | 0.10 |
| $Na_2O$ | 0.03 | 1.7 | 0.26 | 0.00 | 0.004 | 0.33 | 0.27 |
| $K_2O$ | 0.44 | 0.25 | 0.00 | 0.18 | 0.127 | 0.40 | 0.43 |
| Cl | | | | | | 0.000 | 0.01 |
| F | | | | | | 0.000 | 0.00 |
| $P_2O_5$ | 0.02 | 0.18 | 0.02 | 0.13 | | 0.048 | 0.06 |
| $Mn_2O_3$ | | | | | | 0.000 | 0.07 |
| TOTALS | 99.28 | 98.90 | 97.52 | 99.52 | 99.91 | 99.22 | 99.89 |

The clinker produced in accordance with the present inventions will therefore have the following calculated chemical composition as shown in Table 22 below.

TABLE 22

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.73 | 5.02 | 3.58 | 0.47 | 64.58 | 3.19 | 0.10 | 0.50 | 0.60 | 0.0 | 0.0 | 0.07 | 0.00 |

Additionally, the clinker has the following calculated mineral properties as shown in Table 23 below.

TABLE 23

| Limestone Saturation Factor | Silica Ratio | Alumina Ratio | Na2O Equivalent | C3A | C4AF | C4AF + 2C3A |
|---|---|---|---|---|---|---|
| 98.03 | 2.41 | 1.40 | 0.89 | 7.26 | 10.87 | 25.39 |

Example 8

A portland cement plant is designed to produce approximately 650,000 tons of portland cement using the method described in accordance with the present invention. To produce 650.000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 24 below. The raw meal clinker target composition is shown in column 8. The calculated clinker target composition is shown in Tables 25 and 26 below. The source of the iron, alumina and silica is provided by the calcium-iron-alumina-silicate in the form of basaltic hyaloclastite STP, with a chemical composition shown in column 3 and an amorphous content of 90 percent. The sum of calcium, iron, alumina and silica needed to meet the target raw meal composition found in the limestone from column 2 and hyaloclastite from column 3 meets the requirement of iron, alumina and silica of the target raw meal shown in column 8 and therefore no corrective iron, alumina and silica is needed as "zero" is shown in column 4, 5 and 6. The 1 million tons of raw meal is now composed of 78 percent limestone and 22 percent of basaltic hyaloclastite such that 780.000 tons of limestone and 220,000 tons of basaltic hyaloclastite are required. The limestone and basaltic hyaloclastite are ground to the target particle size, mixed and fed into a conventional portland cement clinker kiln. As the raw meal travels from one end of the kiln to the hot end of the kiln, the limestone is calcined and the iron, alumina and silica from the basaltic hyaloclastite sinter with the calcium oxide derived from the limestone calcination to form hydraulic cement clinker. The limestone used in this example have the same properties as the limestone used in Example 2 above. Compared with the conventional clinker manufacturing process from Example 2, there are an estimated 67,000 tons of limestone less being used in the process resulting in approximately 39,000 tons of $CO_2$ not being emitted and therefore not having to be sequestered or mineralized.

TABLE 24

| 1 Material | 2 Limestone | 3 STP | 4 Iron Corrective | 5 Alumina Corrective | 6 Silica Corrective | 7 Calculated Raw meal | 8 Raw meal target |
|---|---|---|---|---|---|---|---|
| Dosage wet [%] | 78.00 | 22.00 | 0.00 | 0.00 | 0.00 | 100.00 | |
| Dosage dry [%] | 78.00 | 22.00 | 0.00 | 0.00 | 0.00 | 100.00 | |
| Dosage wet [t] | 780,000 | 220,000 | 0 | 0 | 0 | 1,000,000 | |
| Dosage dry [t] | 780,000 | 220,000 | 0 | 0 | 0 | 1,000,000 | 1,000,000 |
| Chemical Analysis | | | | | | | |
| LOI | 41.61 | 1.5 | −6.57 | 13.44 | 0.11 | 32.79 | 34.00 |
| $SiO_2$ | 4.16 | 46.98 | 2.67 | 21.97 | 99.28 | 13.58 | 14.00 |
| $Al_2O_3$ | 1.12 | 13.53 | 0.40 | 45.15 | 0.272 | 3.85 | 4.00 |
| $Fe_2O_3$ | 0.3 | 11.86 | 99.41 | 15.70 | 0.052 | 2.84 | 3.00 |
| $TiO_2$ | 0.04 | 1.56 | 0.02 | 2.34 | | 0.37 | 0.20 |
| CaO | 51.06 | 11.45 | 1.06 | 0.56 | 0.026 | 42.35 | 42.00 |
| MgO | 0.42 | 9.89 | 0.20 | 0.00 | 0.04 | 2.50 | 1.20 |
| $SO_3$ | 0.08 | | 0.04 | 0.04 | | 0.06 | 0.10 |
| $Na_2O$ | 0.03 | 1.7 | 0.26 | 0.00 | 0.004 | 0.40 | 0.27 |
| $K_2O$ | 0.44 | 0.25 | 0.00 | 0.18 | 0.127 | 0.40 | 0.43 |
| Cl | | | | | | 0.000 | 0.01 |
| F | | | | | | 0.000 | 0.00 |
| $P_2O_5$ | 0.02 | 0.18 | 0.02 | 0.13 | | 0.055 | 0.06 |
| $Mn_2O_3$ | | | | | | 0.000 | 0.07 |
| TOTALS | 99.28 | 98.90 | 97.52 | 99.52 | 99.91 | 99.20 | 99.34 |

The clinker produced in accordance with the present inventions will therefore have the following calculated chemical composition as shown in Table 25 below.

TABLE 25

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.20 | 5.73 | 4.23 | 0.56 | 63.00 | 3.72 | 0.09 | 0.59 | 0.59 | 0.0 | 0.0 | 0.08 | 0.00 |

Additionally, the clinker has the following calculated mineral properties as shown in Table 26 below.

TABLE 26

| Limestone Saturation Factor | Silica Ratio | Alumina Ratio | Na2O Equivalent | C3A | C4AF | C4AF + 2C3A |
|---|---|---|---|---|---|---|
| 96.00 | 2.03 | 1.35 | 0.98 | 8.02 | 12.86 | 28.90 |

Example 9

A portland cement plant is designed to produce approximately 650,000 tons of portland cement using the method described in accordance with the present invention. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 27 below. The raw meal clinker target composition is shown in column 8. The calculated clinker target composition is shown in Tables 28 and 29 below. The source of the iron, alumina and silica is provided by the calcium-iron-alumina-silicate in the form of basaltic lava LBF-15, with a chemical composition shown in column 3 and an amorphous content of 15 percent. The sum of calcium, iron and alumina needed to meet the target raw meal composition found in the limestone from column 2 and lava from column 3 meets the requirement of iron and alumina of the target raw meal shown in column 8 and therefore no corrective iron and alumina is needed as "zero" shown in column 4 and 5. Additionally to meet the raw meal target amount of silica shown in column 8, as small amount of silica corrective in the form of quartz sand material is added having the chemical composition shown in column 6. The 1 million tons of raw meal is now composed of 80 percent limestone, 18 percent of basaltic lava and 2 percent of quartz sand such that 800,000 tons of limestone, 180,000 tons of basaltic lava and 20,000 tons of silica sand are required. The limestone, basaltic lava and silica sand are ground to the target particle size, mixed and fed into a conventional portland cement clinker kiln. As the raw meal travels from one end of the kiln to the hot end of the kiln, the limestone is calcined and the iron, alumina and silica from the basaltic lava along with the silica from the quartz sand sinter with the calcium oxide derived from the limestone calcination to form hydraulic cement clinker. The limestone and silica used in this example have the same properties as the limestone and silica used in Example 2 above. Compared with the conventional clinker manufacturing process from Example 2, there are an estimated 47,000 tons of limestone less being used in the process resulting in approximately 27,400 tons of $CO_2$ not being emitted and therefore not having to be sequestered or mineralized.

TABLE 27

| 1 Material | 2 Limestone | 3 LBF 15 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 80.00 | 18.00 | 0.00 | 0.00 | 2.00 | 100.00 | 1,000,000 |
| Dosage dry [%] | 80.00 | 18.00 | 0.00 | 0.00 | 2.00 | 100.00 | |
| Dosage wet [t] | 800,000 | 180,000 | 0 | 0 | 20,000 | 1,000,000 | |
| Dosage dry [t] | 800,000 | 180,000 | 0 | 0 | 20,000 | 1,000,000 | |
| Chemical Analysis | | | | | | | |
| LOI | 41.61 | 1 | −6.57 | 13.44 | 0.11 | 33.47 | 35.30 |
| $SiO_2$ | 4.16 | 47.09 | 2.67 | 21.97 | 99.28 | 13.79 | 14.25 |
| $Al_2O_3$ | 1.12 | 13.18 | 0.40 | 45.15 | 0.272 | 3.27 | 3.00 |
| $Fe_2O_3$ | 0.3 | 11.61 | 99.41 | 15.70 | 0.052 | 2.33 | 2.00 |
| $TiO_2$ | 0.04 | 1.59 | 0.02 | 2.34 | | 0.32 | 0.20 |
| CaO | 51.06 | 11.46 | 1.06 | 0.56 | 0.026 | 42.91 | 43.00 |
| MgO | 0.42 | 10.64 | 0.20 | 0.00 | 0.04 | 2.25 | 1.20 |
| $SO_3$ | 0.08 | 0.03 | 0.04 | 0.04 | | 0.07 | 0.10 |
| $Na_2O$ | 0.03 | 1.83 | 0.26 | 0.00 | 0.004 | 0.35 | 0.27 |
| $K_2O$ | 0.44 | 0.39 | 0.00 | 0.18 | 0.127 | 0.42 | 0.43 |
| Cl | | | | | | 0.000 | 0.01 |
| F | | | | | | 0.000 | 0.00 |
| $P_2O_5$ | 0.02 | 0.20 | 0.02 | 0.13 | | 0.052 | 0.06 |
| $Mn_2O_3$ | | | | | | 0.000 | 0.07 |
| TOTALS | 99.28 | 99.02 | 97.52 | 99.52 | 99.91 | 99.25 | 99.89 |

The clinker produced in accordance with the present inventions will therefore have the following calculated chemical composition as shown in Table 28 below.

TABLE 28

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.73 | 4.92 | 3.50 | 0.48 | 64.50 | 3.38 | 0.10 | 0.53 | 0.64 | 0.0 | 0.0 | 0.08 | 0.00 |

Additionally, the clinker has the following calculated mineral properties as shown in Table 29 below.

TABLE 29

| Limestone Saturation Factor | Silica Ratio | Alumina Ratio | Na2O Equivalent | C3A | C4AF | C4AF + 2C3A |
|---|---|---|---|---|---|---|
| 98.13 | 2.46 | 1.40 | 0.95 | 7.11 | 10.65 | 24.88 |

Example 10

A portland cement plant is designed to produce approximately 650,000 tons of portland cement using the method described in accordance with the present invention. To produce 650,000 tons of portland cement a total of approximately 1 million tons of raw meal has to be mined, crushed, milled and combined to be fed into a kiln for the production of clinker. Limestone is mined and crushed from a quarry having the chemical composition shown in column 2 of Table 30 below. The raw meal clinker target composition is shown in column 8. The calculated clinker target composition is shown in Tables 31 and 32 below. The source of the iron, alumina and silica is provided by the calcium-iron-alumina-silicate in the form of basaltic lava LBF-15, with a chemical composition shown in column 3 and an amorphous content of 15 percent. The sum of calcium, iron, alumina and silica needed to meet the target raw meal composition found in the limestone from column 2 and lava from column 3 meets the requirement of iron, alumina and silica of the target raw meal shown in column 8 and therefore no corrective iron, alumina and silica is needed as "zero" is shown in column 4, 5 and 6. The 1 million tons of raw meal is now composed of 78 percent limestone and 22 percent of basaltic lava such that 780,000 tons of limestone and 220.000 tons of basaltic lava are required. The limestone and basaltic lava are ground to the target particle size, mixed and fed into a conventional portland cement clinker kiln. As the raw meal travels from one end of the kiln to the hot end of the kiln, the limestone is calcined and the iron, alumina and silica from the basaltic lava sinter with the calcium oxide resulted from the limestone calcination to form hydraulic cement clinker. The limestone used in this example have the same properties as the limestone used in Example 2 above. Compared with the conventional clinker manufacturing process from Example 2, there are an estimated 67,000 tons of limestone less being used in the process resulting in approximately 39,000 tons of $CO_2$ not being emitted and therefore not having to be sequestered or mineralized.

TABLE 30

| 1 Material | 2 Limestone | 3 LBF 15 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 78.00 | 22.00 | 0.00 | 0.00 | 0.00 | 100.00 | 1,000,000 |
| Dosage dry [%] | 78.00 | 22.00 | 0.00 | 0.00 | 0.00 | 100.00 | |
| Dosage wet [t] | 780,000 | 220,000 | 0 | 0 | 0 | 1,000,000 | |
| Dosage dry [t] | 780,000 | 220,000 | 0 | 0 | 0 | 1,000,000 | |
| Chemical Analysis | | | | | | | |
| LOI | 41.61 | 1 | −6.57 | 13.44 | 0.11 | 32.68 | 35.30 |
| $SiO_2$ | 4.16 | 47.09 | 2.67 | 21.97 | 99.28 | 13.60 | 14.25 |
| $Al_2O_3$ | 1.12 | 13.18 | 0.40 | 45.15 | 0.272 | 3.77 | 3.00 |
| $Fe_2O_3$ | 0.3 | 11.61 | 99.41 | 15.70 | 0.052 | 2.79 | 2.00 |
| $TiO_2$ | 0.04 | 1.59 | 0.02 | 2.34 | | 0.38 | 0.20 |
| CaO | 51.06 | 11.46 | 1.06 | 0.56 | 0.026 | 42.35 | 43.00 |
| MgO | 0.42 | 10.64 | 0.20 | 0.00 | 0.04 | 2.67 | 1.20 |
| $SO_3$ | 0.08 | 0.03 | 0.04 | 0.04 | | 0.07 | 0.10 |
| $Na_2O$ | 0.03 | 1.83 | 0.26 | 0.00 | 0.004 | 0.43 | 0.27 |
| $K_2O$ | 0.44 | 0.39 | 0.00 | 0.18 | 0.127 | 0.43 | 0.43 |
| Cl | | | | | | 0.000 | 0.01 |
| F | | | | | | 0.000 | 0.00 |
| $P_2O_5$ | 0.02 | 0.20 | 0.02 | 0.13 | | 0.060 | 0.06 |
| $Mn_2O_3$ | | | | | | 0.000 | 0.07 |
| TOTALS | 99.28 | 99.02 | 97.52 | 99.52 | 99.91 | 99.22 | 99.89 |

The clinker produced in accordance with the present inventions will therefore have the following calculated chemical composition as shown in Table 31 below.

TABLE 31

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.21 | 5.60 | 4.14 | 0.57 | 62.90 | 3.96 | 0.10 | 0.63 | 0.64 | 0.0 | 0.0 | 0.09 | 0.00 |

Additionally, the clinker has the following calculated mineral properties as shown in Table 32 below.

TABLE 32

| Limestone Saturation Factor | Silica Ratio | Alumina Ratio | Na2O Equivalent | C3A | C4AF | C4AF + 2C3A |
|---|---|---|---|---|---|---|
| 96.12 | 2.07 | 1.35 | 1.05 | 7.84 | 12.59 | 28.28 |

Example 11

Limestone with a chemical composition shown in column 1 of Table 33 below (same type of limestone used in Example 2 above) is mined from a quarry and delivered to a processing plant where it is ground to a fine particle size suitable for indirect calcination to produce calcium oxide (lime) using a carbon capture plant such as the Leilac France.

Alternatively, the calcium oxide (lime) can be produced by a process of electrochemical separation of the $CO_2$ from limestone ($CaCO_3$) where the limestone is dissolved in a solution and fed into an electrochemical reactor which uses an electrolysis process to separate the $CO_2$ from the CaO or CaOH and all other elements. The resulting calcium oxide (lime) or CaOH (hydrated lime) containing other elements is shown in column 2 of Table 33 below that is used in the process described herein.

Additionally, calcium oxide (lime) or calcium hydroxide (hydrated lime) used in this example can be produced by any other known or possible methods or processes and the particular process used to make calcium oxide or calcium hydroxide is not critical to the present invention.

The $CO_2$ generated by the any one of the processes above can be captured, sequestered, used or mineralized in any known way or as described in the patents mentioned above.

TABLE 33

| | | 1<br>Limestone | 2<br>Lime plus oxides |
|---|---|---|---|
| Chemical | LOI | 41.61 | 1.00 |
| analysis | $SiO_2$ | 4.16 | 7.12 |
| DRY | $Al_2O_3$ | 1.12 | 1.92 |
| BASYS | $Fe_2O_3$ | 0.3 | 0.51 |
| % | $TiO_2$ | 0.04 | 0.07 |
| | CaO | 51.06 | 87.45 |
| | MgO | 0.42 | 0.72 |
| | $SO_3$ | 0.08 | 0.14 |
| | $Na_2O$ | 0.03 | 0.05 |
| | $K_2O$ | 0.44 | 0.75 |
| | Cl | | |
| | F | | |
| | $P_2O_5$ | 0.02 | 0.03 |
| | $Mn_2O_3$ | | |
| | TOTALS | 99.28 | 99.77 |

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 is ground to a particle size similar to the lime shown in column 2 of Table 33 above produced by the methods described above or any other method available. The lime and calcium-iron-aluminosilicate mineral are blended together, in a ratio of approximately 68% lime and approximately 32% calcium-iron-aluminosilicate mineral. The blended composition is then fed into a calcining clinker kiln typical for the clinker manufacture. The kiln is fired to a temperature of approximately 1250 to 1400° C. and the blended composition is kept in the kiln for a period of time sufficient for the production of clinker with the various clinker phases such as one or more of the Tricalcium silicate $(CaO)_3 \cdot SiO_2$, also known as $C_3S$, Dicalcium silicate $(CaO)_2 \cdot SiO_2$, also known as $C_2S$, Tricalcium aluminate $(CaO)_3 \cdot Al_2O_3$, also known as $C_3A$ Tetracalcium aluminoferrite $(CaO)_4 \cdot Al_2O_3 \cdot Fe_2O_3$ also known as $C_4AF$.

Example 12

A portland cement plant using an indirect limestone calcination process, (where limestone is calcined prior to mixing with the iron, alumina and silica correctives), using a carbon capture technology such as Leilac France, producing calcium oxide (lime) is designed to produce approximately 650,000 tons of portland cement. To produce 650,000 tons of portland cement a total of approximately 650,000 tons of raw meal composed of lime and the source of iron, alumina and silica have to be combined to be fed into a kiln for the production of clinker. Limestone is mined and crushed from a quarry having the chemical composition shown in Column 1 of Table 33 and processed into lime having the chemical composition shown in column 2 of Table 34 below. The raw meal clinker target composition is shown in column 8. The calculated clinker target composition is shown in Tables 35 and 36 below. The source of the iron, alumina and silica is provided by the calcium-iron-alumina-silicate in the form of basaltic hyaloclastite LS18-1 10, with a chemical composition shown in column 3 and an amorphous content of 90 percent. The sum of calcium, iron, alumina and silica needed to meet the target raw meal composition found in the lime from column 2 and hyaloclastite from column 3 meets the requirement of iron, alumina and silica of the target raw meal shown in column 8 and therefore no corrective iron, alumina and silica is needed as "zero" is shown in column 4, 5 and 6. The 650,000 tons of raw meal is now composed of 69 percent lime and 31 percent of basaltic hyaloclastite such that 448,500 tons of lime and 201,500 tons of basaltic hyaloclastite are required. The lime and basaltic hyaloclastite are ground to the target particle size, mixed and fed into a conventional portland cement clinker kiln. As the raw meal travels from one end of the kiln to the hot end of the kiln, the iron, alumina and silica from the basaltic hyaloclastite sinter with the calcium oxide derived from the lime to form hydraulic cement clinker. The lime used in this example have the same properties as the lime shown in column 2 of Table 33 above and can be manufactured by any process known to produce lime or hydrated lime including by electrolysis. Compared with the Leilac clinker manufacturing process from Example 11, there are an estimated 23,000 tons of lime less being used in the process resulting in approximately 13,500 tons of $CO_2$ not being emitted and therefore not having to be sequestered or mineralized.

Example 13

A portland cement plant using an indirect limestone calcination process. (where limestone is calcined prior to mixing with the iron, alumina and silica correctives), using a carbon capture technology such as Leilac France, producing calcium oxide (lime) is designed to produce approximately 650,000 tons of portland cement. To produce 650,000 tons of portland cement a total of approximately 650,000 tons of raw meal composed of lime and the source of iron, alumina and silica have to be combined to be fed into a kiln for the production of clinker. Limestone is mined and crushed from a quarry having the chemical composition shown in Column 1 of Table 33 and processed into lime having the chemical composition shown in column 2 of Table 37 below. The raw meal clinker target composition is shown in column 8. The calculated clinker target composition is shown in Tables 38 and 39 below. The source of the iron, alumina and silica is provided by the calcium-iron-

TABLE 34

| 1 Material | 2 Lime (CaO) | 3 LS 18-1 10 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 69.00 | 31.00 | 0.00 | 0.00 | 0.00 | 100.00 | 650,000 |
| Dosage dry [%] | 69.00 | 31.00 | 0.00 | 0.00 | 0.00 | 100.00 | |
| Dosage wet [t] | 448,500 | 201,500 | 0 | 0 | 0 | 650,000 | |
| Dosage dry [t] | 448,500 | 201,500 | 0 | 0 | 0 | 650,000 | |
| Chemical Analysis | | | | | | | |
| LOI | 1.00 | 1 | −6.57 | 13.44 | 0.11 | 1.00 | 0.00 |
| $SiO_2$ | 7.12 | 48.8 | 2.67 | 21.97 | 99.28 | 20.04 | 20.00 |
| $Al_2O_3$ | 1.92 | 15 | 0.40 | 45.15 | 0.272 | 5.97 | 5.00 |
| $Fe_2O_3$ | 0.51 | 13.5 | 99.41 | 15.70 | 0.052 | 4.54 | 4.62 |
| $TiO_2$ | 0.07 | 1.58 | 0.02 | 2.34 | | 0.54 | 0.20 |
| CaO | 87.45 | 8.85 | 1.06 | 0.56 | 0.026 | 63.08 | 66.15 |
| MgO | 0.72 | 5.9 | 0.20 | 0.00 | 0.04 | 2.33 | 1.85 |
| $SO_3$ | 0.14 | | 0.04 | 0.04 | | 0.09 | 0.15 |
| $Na_2O$ | 0.05 | 3.59 | 0.26 | 0.00 | 0.004 | 1.15 | 0.42 |
| $K_2O$ | 0.75 | 1.21 | 0.00 | 0.18 | 0.127 | 0.90 | 0.66 |
| Cl | | | | | | 0.000 | 0.02 |
| F | | | | | | 0.000 | 0.00 |
| $P_2O_5$ | 0.03 | 0.34 | 0.02 | 0.13 | | 0.129 | 0.09 |
| $Mn_2O_3$ | | | | | | 0.000 | 0.10 |
| TOTALS | 99.77 | 99.77 | 97.52 | 99.52 | 99.91 | 99.77 | 99.26 |

The clinker produced in accordance with the present inventions will therefore have the following calculated chemical composition as shown in Table 35 below.

TABLE 35

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.25 | 6.03 | 4.59 | 0.54 | 63.72 | 2.35 | 0.10 | 1.16 | 0.90 | 0.0 | 0.0 | 0.13 | 0.00 |

Additionally, the clinker has the following calculated mineral properties as shown in Table 36 below.

TABLE 36

| Limestone Saturation Factor | Silica Ratio | Alumina Ratio | $Na_2O$ Equivalent | C3A | C4AF | C4AF + 2C3A |
|---|---|---|---|---|---|---|
| 96.10 | 1.91 | 1.32 | 1.75 | 8.23 | 13.94 | 30.40 | alumina-silicate in the form of basaltic hyaloclastite LS36-2 20, with a chemical composition shown in column 3 and an amorphous content of 60 percent. The sum of calcium, iron, alumina and silica needed to meet the target raw meal composition found in the lime from column 2 and hyaloclastite from column 3 meets the requirement of iron, alumina and silica of the target raw meal shown in column 8 and therefore no corrective iron, alumina and silica is needed as "zero" is shown in column 4, 5 and 6. The 650.000 tons of raw meal is now composed of 69 percent lime and 31 percent of basaltic hyaloclastite such that 429.000 tons of lime and 221,000 tons of basaltic hyaloclastite are required. The lime and basaltic hyaloclastite are ground to the target particle size, mixed and fed into a conventional portland cement clinker kiln. As the raw meal travels from one end of the kiln to the hot end of the kiln, the iron, alumina and silica from the basaltic hyaloclastite sinter with the calcium oxide derived from the lime to form hydraulic cement clinker. The lime used in this example have the same properties as the lime shown in column 2 of Table 33 above and can be manufactured by any process known to produce lime or hydrated lime including by electrolysis. Compared with the Leilac clinker manufacturing process from Example 11, there are an estimated 23,000 tons of lime less being used in the process resulting in approximately 15,000 tons of $CO_2$ not being emitted and therefore not having to be sequestered or mineralized.

000 tons of portland cement a total of approximately 650,000 tons of raw meal composed of lime and the source of iron, alumina and silica have to be combined to be fed into a kiln for the production of clinker. Limestone is mined and crushed from a quarry having the chemical composition shown in Column 1 of Table 33 and processed into lime having the chemical composition shown in column 2 of Table 40 below. The raw meal clinker target composition is shown in column 8. The calculated clinker target composition is shown in Tables 41 and 42 below. The source of the iron, alumina and silica is provided by the calcium-iron-alumina-silicate in the form of basaltic hyaloclastite STP,

TABLE 37

| 1 Material | 2 Lime (CaO) | 3 LS 36-2 20 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 66.00 | 34.00 | 0.00 | 0.00 | 0.00 | 100.00 | 650,000 |
| Dosage dry [%] | 66.00 | 34.00 | 0.00 | 0.00 | 0.00 | 100.00 | |
| Dosage wet [t] | 429,000 | 221,000 | 0 | 0 | 0 | 650,000 | |
| Dosage dry [t] | 429,000 | 221,000 | 0 | 0 | 0 | 650,000 | |
| Chemical Analysis | | | | | | | |
| LOI | 1.00 | 3 | −6.57 | 13.44 | 0.11 | 1.68 | 0.00 |
| $SiO_2$ | 7.12 | 44.4 | 2.67 | 21.97 | 99.28 | 19.80 | 20.00 |
| $Al_2O_3$ | 1.92 | 12.7 | 0.40 | 45.15 | 0.272 | 5.58 | 5.00 |
| $Fe_2O_3$ | 0.51 | 12.2 | 99.41 | 15.70 | 0.052 | 4.49 | 4.62 |
| $TiO_2$ | 0.07 | 1.64 | 0.02 | 2.34 | | 0.60 | 0.20 |
| CaO | 87.45 | 15.6 | 1.06 | 0.56 | 0.026 | 63.02 | 66.15 |
| MgO | 0.72 | 5.76 | 0.20 | 0.00 | 0.04 | 2.43 | 1.85 |
| $SO_3$ | 0.14 | | 0.04 | 0.04 | | 0.09 | 0.15 |
| $Na_2O$ | 0.05 | 3.24 | 0.26 | 0.00 | 0.004 | 1.14 | 0.42 |
| $K_2O$ | 0.75 | 1.08 | 0.00 | 0.18 | 0.127 | 0.86 | 0.66 |
| Cl | | | | | | 0.000 | 0.02 |
| F | | | | | | 0.000 | 0.00 |
| $P_2O_5$ | 0.03 | 0.34 | 0.02 | 0.13 | | 0.138 | 0.09 |
| $Mn_2O_3$ | | | | | | 0.000 | 0.10 |
| TOTALS | 99.77 | 99.96 | 97.52 | 99.52 | 99.91 | 99.83 | 99.26 |

The clinker produced in accordance with the present inventions will therefore have the following calculated chemical composition as shown in Table 38 below.

TABLE 38

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.14 | 5.68 | 4.56 | 0.61 | 64.10 | 2.47 | 0.09 | 1.15 | 0.88 | 0.0 | 0.0 | 0.14 | 0.00 |

Additionally, the clinker has the following calculated mineral properties as shown in Table 39 below.

TABLE 39

| Limestone Saturation Factor | Silica Ratio | Alumina Ratio | Na2O Equivalent | C3A | C4AF | C4AF + 2C3A |
|---|---|---|---|---|---|---|
| 97.71 | 1.97 | 1.24 | 1.73 | 7.33 | 13.87 | 28.53 |

Example 14

A portland cement plant using an indirect limestone calcination process. (where limestone is calcined prior to mixing with the iron, alumina and silica correctives), using a carbon capture technology such as Leilac France, producing calcium oxide (lime) is designed to produce approximately 650,000 tons of portland cement. To produce 650, with a chemical composition shown in column 3 and an amorphous content of 90 percent. The sum of calcium, iron, alumina and silica needed to meet the target raw meal composition found in the lime from column 2 and hyaloclastite from column 3 meets the requirement of iron, alumina and silica of the target raw meal shown in column 8 and therefore no corrective iron, alumina and silica is needed as "zero" is shown in column 4, 5 and 6. The 650.000 tons of raw meal is now composed of 68 percent lime and 32 percent of basaltic hyaloclastite such that 442.000 tons of lime and 208,000 tons of basaltic hyaloclastite are required. The lime and basaltic hyaloclastite are ground to the target particle size, mixed and fed into a conventional portland cement clinker kiln. As the raw meal travels from one end of the kiln to the hot end of the kiln, the iron, alumina and silica from the basaltic hyaloclastite sinter with the calcium oxide derived from the lime to form hydraulic cement clinker. The lime used in this example have the same properties as the lime shown in column 2 of Table 33 above and can be manufactured by any process known to produce lime or hydrated lime including by electrolysis. Compared with the Leilac clinker manufacturing process from Example 11, there are an estimated 23,000 tons of lime less being used in the process resulting in approximately 14,000 tons of $CO_2$ not being emitted and therefore not having to be sequestered or mineralized.

having the chemical composition shown in column 2 of Table 43 below. The raw meal clinker target composition is shown in column 8. The calculated clinker target composition is shown in Tables 44 and 45 below. The source of the

TABLE 40

| 1<br>Material | 2<br>Lime<br>(CaO) | 3<br>STP | 4<br>Iron<br>Corrective | 5<br>Alumina<br>Corrective | 6<br>Silica<br>Corrective | 7<br>Calculated<br>Raw meal | 8<br>Raw meal<br>target |
|---|---|---|---|---|---|---|---|
| Dosage wet [%] | 68.00 | 32.00 | 0.00 | 0.00 | 0.00 | 100.00 | 650,000 |
| Dosage dry [%] | 68.00 | 32.00 | 0.00 | 0.00 | 0.00 | 100.00 | |
| Dosage wet [t] | 442,000 | 208,000 | 0 | 0 | 0 | 650,000 | |
| Dosage dry [t] | 442,000 | 208,000 | 0 | 0 | 0 | 650,000 | |
| Chemical Analysis | | | | | | | |
| LOI | 1.00 | 1.5 | −6.57 | 13.44 | 0.11 | 1.16 | 0.00 |
| $SiO_2$ | 7.12 | 46.98 | 2.67 | 21.97 | 99.28 | 19.88 | 20.00 |
| $Al_2O_3$ | 1.92 | 13.53 | 0.40 | 45.15 | 0.272 | 5.63 | 5.00 |
| $Fe_2O_3$ | 0.51 | 11.86 | 99.41 | 15.70 | 0.052 | 4.14 | 4.62 |
| $TiO_2$ | 0.07 | 1.56 | 0.02 | 2.34 | | 0.55 | 0.20 |
| CaO | 87.45 | 11.45 | 1.06 | 0.56 | 0.026 | 63.13 | 66.15 |
| MgO | 0.72 | 9.89 | 0.20 | 0.00 | 0.04 | 3.65 | 1.85 |
| $SO_3$ | 0.14 | | 0.04 | 0.04 | | 0.09 | 0.15 |
| $Na_2O$ | 0.05 | 1.7 | 0.26 | 0.00 | 0.004 | 0.58 | 0.42 |
| $K_2O$ | 0.75 | 0.25 | 0.00 | 0.18 | 0.127 | 0.59 | 0.66 |
| Cl | | | | | | 0.000 | 0.02 |
| F | | | | | | 0.000 | 0.00 |
| $P_2O_5$ | 0.03 | 0.18 | 0.02 | 0.13 | | 0.081 | 0.09 |
| $Mn_2O_3$ | | | | | | 0.000 | 0.10 |
| TOTALS | 99.77 | 98.90 | 97.52 | 99.52 | 99.91 | 99.49 | 99.26 |

The clinker produced in accordance with the present inventions will therefore have the following calculated chemical composition as shown in Table 41 below.

TABLE 41

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.11 | 5.70 | 4.19 | 0.55 | 63.87 | 3.70 | 0.09 | 0.59 | 0.60 | 0.0 | 0.0 | 0.08 | 0.00 |

Additionally, the clinker has the following calculated mineral properties as shown in Table 42 below.

TABLE 42

| Limestone<br>Saturation<br>Factor | Silica<br>Ratio | Alumina<br>Ratio | Na2O<br>Equivalent | C3A | C4AF | C4AF +<br>2C3A |
|---|---|---|---|---|---|---|
| 97.80 | 2.03 | 1.36 | 0.98 | 8.01 | 12.75 | 28.77 |

Example 15

A portland cement plant using an indirect limestone calcination process. (where limestone is calcined prior to mixing with the iron, alumina and silica correctives), using a carbon capture technology such as Leilac France, producing calcium oxide (lime) is designed to produce approximately 650,000 tons of portland cement. To produce 650,000 tons of portland cement a total of approximately 650,000 tons of raw meal composed of lime and the source of iron, alumina and silica have to be combined to be fed into a kiln for the production of clinker. Limestone is mined and crushed from a quarry having the chemical composition shown in Column 1 of Table 33 and processed into lime having the chemical composition shown in column 2 of Table 43 below. The raw meal clinker target composition is shown in column 8. The calculated clinker target composition is shown in Tables 44 and 45 below. The source of the iron, alumina and silica is provided by the calcium-iron-alumina-silicate in the form of basaltic lava LBF 15, with a chemical composition shown in column 3 and an amorphous content of 15 percent. The sum of calcium, iron, alumina and silica needed to meet the target raw meal composition found in the lime from column 2 and lava from column 3 meets the requirement of iron, alumina and silica of the target raw meal shown in column 8 and therefore no corrective iron, alumina and silica is needed as "zero" is shown in column 4, 5 and 6. The 650,000 tons of raw meal is now composed of 68 percent lime and 32 percent of basaltic lava such that 442,000 tons of lime and 208,000 tons of basaltic lava are required. The lime and basaltic lava are ground to the target particle size, mixed and fed into a conventional portland cement clinker kiln. As the raw meal travels from one end of the kiln to the hot end of the kiln, the iron, alumina and silica from the basaltic lava sinter with the calcium oxide derived from the lime to form hydraulic cement clinker. The lime used in this example have the same properties as the lime shown in column 2 of Table 33 above and can be manufactured by any process known to produce lime or hydrated lime including by electrolysis. Compared with the Leilac clinker manufacturing process from Example 11, there are an estimated 23,000 tons of lime less being used in the process resulting in approximately 14,000 tons of $CO_2$ not being emitted and therefore not having to be sequestered or mineralized.

TABLE 43

| 1 Material | 2 Lime (CaO) | 3 LBF 15 | 4 Iron Corrective | 5 Alumina Corrective | 6 Silica Corrective | 7 Calculated Raw meal | 8 Raw meal target |
|---|---|---|---|---|---|---|---|
| Dosage wet [%] | 68.00 | 32.00 | 0.00 | 0.00 | 0.00 | 100.00 | 650,000 |
| Dosage dry [%] | 68.00 | 32.00 | 0.00 | 0.00 | 0.00 | 100.00 | |
| Dosage wet [t] | 442,000 | 208,000 | 0 | 0 | 0 | 650,000 | |
| Dosage dry [t] | 442,000 | 208,000 | 0 | 0 | 0 | 650,000 | |
| Chemical Analysis | | | | | | | |
| LOI | 1.00 | 1 | −6.57 | 13.44 | 0.11 | 1.00 | 0.00 |
| $SiO_2$ | 7.12 | 47.09 | 2.67 | 21.97 | 99.28 | 19.91 | 20.00 |
| $Al_2O_3$ | 1.92 | 13.18 | 0.40 | 45.15 | 0.272 | 5.52 | 5.00 |
| $Fe_2O_3$ | 0.51 | 11.61 | 99.41 | 15.70 | 0.052 | 4.06 | 4.62 |
| $TiO_2$ | 0.07 | 1.59 | 0.02 | 2.34 | | 0.56 | 0.20 |
| CaO | 87.45 | 11.46 | 1.06 | 0.56 | 0.026 | 63.13 | 66.15 |
| MgO | 0.72 | 10.64 | 0.20 | 0.00 | 0.04 | 3.89 | 1.85 |
| $SO_3$ | 0.14 | 0.03 | 0.04 | 0.04 | | 0.10 | 0.15 |
| $Na_2O$ | 0.05 | 1.83 | 0.26 | 0.00 | 0.004 | 0.62 | 0.42 |
| $K_2O$ | 0.75 | 0.39 | 0.00 | 0.18 | 0.127 | 0.64 | 0.66 |
| Cl | | | | | | 0.000 | 0.02 |
| F | | | | | | 0.000 | 0.00 |
| $P_2O_5$ | 0.03 | 0.20 | 0.02 | 0.13 | | 0.087 | 0.09 |
| $Mn_2O_3$ | | | | | | 0.000 | 0.10 |
| TOTALS | 99.77 | 99.02 | 97.52 | 99.52 | 99.91 | 99.53 | 99.26 |

The clinker produced in accordance with the present inventions will therefore have the following calculated chemical composition as shown in Table 44 below.

TABLE 44

| $SiO_2$ | $Al_2O_3$ | $Fe_2O_3$ | $TiO_2$ | CaO | MgO | $SO_3$ | $Na_2O$ | $K_2O$ | Cl | F | $P_2O_5$ | $Mn_2O_3$ |
|---|---|---|---|---|---|---|---|---|---|---|---|---|
| 20.11 | 5.58 | 4.11 | 0.56 | 63.77 | 3.93 | 0.10 | 0.63 | 0.64 | 0.0 | 0.0 | 0.09 | 0.00 |

Additionally, the clinker has the following calculated mineral properties as shown in Table 45 below.

TABLE 45

| Limestone Saturation Factor | Silica Ratio | Alumina Ratio | Na2O Equivalent | C3A | C4AF | C4AF + 2C3A |
|---|---|---|---|---|---|---|
| 97.92 | 2.08 | 1.36 | 1.05 | 7.83 | 12.48 | 28.15 |

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:
   combining limestone and hyaloclastite to form a mixture; and
   heating the mixture to a sufficient temperature and for a sufficient time to produce a hydraulic cement clinker.

2. The method of claim 1, wherein the mixture is heated in a cement clinker kiln.

3. The method of claim 2, wherein the mixture is heated to a temperature of approximately 1250 to approximately 1450° C.

4. The method of claim 1 further comprising grinding the hydraulic cement clinker to a fine powder.

5. The method of claim 4 further comprising combining the powder with water.

6. The method of claim 1, wherein the hyaloclastite is basaltic hyaloclastite or intermediate basaltic hyaloclastite.

7. A method comprising:
   combining limestone and a calcium-iron-aluminosilicate mineral to form a mixture, wherein the calcium-iron-aluminosilicate mineral comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO; and
   heating the mixture to a sufficient temperature and for a sufficient time to produce a hydraulic cement clinker.

8. The method of claim 7, wherein the sum of the $Al_2O_3+Fe_2O_3$ is approximately 20 to approximately 35 percent by weight.

9. The method of claim 8, wherein the ratio of the $Al_2O_3$ and the $Fe_2O_3$ is approximately 0.75 and approximately 1.50 and the ratio of the $SiO_2$ and the sum of the $Al_2O_3+Fe_2O_3$ is preferably approximately 1.25 and 2.25.

10. The method of claim 7, wherein the calcium-iron-aluminosilicate mineral is hyaloclastite, lava, gabbro, scoria, volcanic ash or pumice.

11. The method of claim 10, wherein the mixture is heated in a cement clinker kiln.

12. The method of claim 11, wherein the mixture is heated to a temperature of approximately 1250 to approximately 1450° C.

13. The method of claim 12 further comprising grinding the hydraulic cement clinker to a fine powder.

14. The method of claim 13 further comprising combining the powder with water.

15. The method of claim 7, wherein the calcium-iron-aluminosilicate mineral is basaltic hyaloclastite or intermediate basaltic hyaloclastite.

16. The method of claim 15, wherein the mixture is heated in a kiln.

17. The method of claim 16, wherein the mixture is heated to a temperature of approximately 1250 to approximately 1450° C.

18. The method of claim 16 further comprising grinding the hydraulic cement clinker to a fine powder.

19. The method of claim 18 further comprising combining the powder with water.

\* \* \* \* \*